United States Patent
Kim et al.

(10) Patent No.: US 7,315,426 B2
(45) Date of Patent: Jan. 1, 2008

(54) METALLIC NANO-OPTIC LENSES AND BEAM SHAPING DEVICES

(75) Inventors: Hong Koo Kim, Pittsburgh, PA (US); Zhijun Sun, Pittsburgh, PA (US); Christopher C. Capelli, Kenosha, WI (US)

(73) Assignee: University of Pittsburgh, Pittsburgh, PA (US)

( * ) Notice: Subject to any disclaimer, the term of this patent is extended or adjusted under 35 U.S.C. 154(b) by 320 days.

(21) Appl. No.: 11/001,154

(22) Filed: Dec. 2, 2004

(65) Prior Publication Data

US 2005/0161589 A1 Jul. 28, 2005

Related U.S. Application Data

(60) Provisional application No. 60/526,998, filed on Dec. 5, 2003.

(51) Int. Cl.
*G02B 9/00* (2006.01)

(52) U.S. Cl. .................. 359/738; 359/298; 250/307

(58) Field of Classification Search ............... 359/738, 359/298, 245, 244; 250/307, 308, 310, 311
See application file for complete search history.

(56) References Cited

U.S. PATENT DOCUMENTS

| | | |
|---|---|---|
| 4,659,429 A | 4/1987 | Isaacson et al. |
| 4,662,747 A | 5/1987 | Isaacson et al. |
| 4,815,854 A | 3/1989 | Tanaka et al. |
| 4,891,830 A | 1/1990 | Iwahashi |
| 4,997,278 A | 3/1991 | Finlan et al. |
| 5,250,812 A | 10/1993 | Murai et al. |
| 5,306,902 A | 4/1994 | Goodman |
| 5,351,127 A | 9/1994 | King et al. |
| 5,354,985 A | 10/1994 | Quate |
| 5,359,681 A | 10/1994 | Jorgenson et al. |
| 5,451,980 A | 9/1995 | Simon et al. |
| 5,570,139 A | 10/1996 | Wang |
| 5,633,972 A | 5/1997 | Walt et al. |
| 5,647,030 A | 7/1997 | Jorgenson et al. |
| 5,663,798 A | 9/1997 | Karrai et al. |
| 5,789,742 A | 8/1998 | Wolff |
| 5,835,645 A | 11/1998 | Jorgenson et al. |
| 5,864,641 A | 1/1999 | Murphy et al. |
| 5,933,233 A | 8/1999 | Gunther et al. |

(Continued)

FOREIGN PATENT DOCUMENTS

WO    WO 2004/023499 A1    3/2004

(Continued)

OTHER PUBLICATIONS

Takunori Ito et al., "Photonic bands of metallic systems. II. Features of surface plasmon polaritons", Physical Review B. vol. 64, 045117-1—045117-8.

P.W. Barber, "Surface-Enhanced Electric Intensities on Large Silver Spheroids", Physical Review Letters vol. 50, No. 13, Mar. 28, 1983, pp. 997-1000.

M. M. J. Treacy, "Dynamical diffraction explanation of the anomalous transmission of light through metallic gratings", Physical Review B 66, 2002, 195105-1—195105-11.

T. López-Rios et al., "Surface Shape Resonances in Lamellar Metallic Gratings", Physical Review Letters, vol. 81, No. 3, Jul. 20, 1998, pp. 665-668.

(Continued)

*Primary Examiner*—Timothy Thompson
(74) *Attorney, Agent, or Firm*—Foley & Lardner LLP

(57) ABSTRACT

A nano-optic device comprises a plurality of subwavelength apertures in a metal film or between metal islands. The device is adapted to shape a radiation beam transmitted there through. For example, beam shaping includes at least one of beam focusing, beam bending and beam collimating.

32 Claims, 30 Drawing Sheets

U.S. PATENT DOCUMENTS

| | | | |
|---|---|---|---|
| 5,946,083 | A | 8/1999 | Melendez et al. |
| 5,973,316 | A | 10/1999 | Ebbesen et al. |
| 5,986,808 | A | 11/1999 | Wang |
| 6,040,936 | A | 3/2000 | Kim et al. |
| 6,052,238 | A | 4/2000 | Ebbesen et al. |
| 6,097,456 | A | 8/2000 | Wang |
| 6,111,248 | A | 8/2000 | Melendez et al. |
| 6,191,847 | B1 | 2/2001 | Melendez et al. |
| 6,236,033 | B1 | 5/2001 | Ebbesen et al. |
| 6,282,005 | B1 | 8/2001 | Thompson et al. |
| 6,285,020 | B1 | 9/2001 | Kim et al. |
| 6,326,004 | B1 | 12/2001 | Greve et al. |
| 6,441,298 | B1 | 8/2002 | Thio |
| 6,514,936 | B1 | 2/2003 | Greve et al. |
| 6,539,156 | B1 | 3/2003 | Dickson et al. |
| 6,753,968 | B2 | 6/2004 | Hill |
| 6,818,907 | B2 * | 11/2004 | Stark ............... 250/492.1 |
| 7,057,151 | B2 * | 6/2006 | Lezec et al. ............ 250/216 |
| 2002/0056816 | A1 * | 5/2002 | Stark ............... 250/493.1 |
| 2003/0036204 | A1 | 2/2003 | Stark et al. |
| 2003/0128949 | A1 | 7/2003 | Kitagawa et al. |

FOREIGN PATENT DOCUMENTS

WO    WO 2004/097894 A2    11/2004

OTHER PUBLICATIONS

Principles of Optics—Electromagnetic theory of propagation, interference and diffraction of light, Max Born et al., Cambridge University Press, 1999.

T.W. Ebbesen et al., "Extraordinary optical transmission through sub-wavelength hole arrays", Nature, vol. 391, Feb. 1998, pp. 667-669.

H.F. Ghaemi et al., "Surface plasmons enhance optical transmission through subwavelength holes", Physical Review B., vol. 58, No. 11, Sep. 15, 1998, pp. 6779-6782.

A. Degiron et al., "Effects of hole depth on enhanced light transmission through subwavelength hole array", Applied Physics Letters, vol. 81, No. 23, Dec. 2, 2002, pp. 4327-4329.

L. Martin-Moreno et al., "Theory of Extraordinary Optical Transmission through Subwavelength Hole Arrays", Physical Review Letters, vol. 86, No. 6, Feb. 5, 2001, pp. 1114-1117.

E. Altewischer et al., "Plasmon-assisted transmission of entangled photons", Nature, vol. 418, Jul. 18, 2002, pp. 304-306.

H. J. Lezec et al., "Beaming Light from a Subwavelength Aperture", Science, vol. 297, Aug. 2, 2002, pp. 820-822.

L. Martin-Moreno et al., "Theory of Highly Directional Emission from a Single Subwavelength Aperture Surrounded by Surface Corrugations", Physical Review Letters, vol. 90, No. 16, pp. 167401-1—167401-4.

William L. Barnes et al., "Surface plasmon subwavelength optics", NATURE, vol. 424, Aug. 14, 2003, pp. 824-830.

U. Schröter et al., "Surface-plasmon-enhanced transmission through metallic gratings", Physical Review B, vol. 58, No. 23, pp. 15419-15421.

J.A. Porto et al., "Transmission Resonances on Metallic Gratings with Very Narrow Slits", Physical Review Letters, vol. 83, No. 14, Oct. 4, 1999, pp. 2845-2848.

S. Astilean et al., "Light transmission through metallic channels much smaller than the wavelength", Optics Communications, 175 (2000), 265-273.

F.J. Garcia-Vidal et al., "Transmission and locusing of light in one-dimensional periodically nanostructured metals", Physical Review B, 66, (2002) 155412-1—155412-10.

F.J. Garcia-Vidal et al., "Multiple Paths to Enhance Optical Transmission through a Single Subwavelength Slit", Physical Review Letters, vol. 90, No. 21, May 30, 2003, pp. 213901-1—213901-4.

Zhijun Sun et al., "Role of Surface Plasmons in the Optical interaction in Metallic Gratings with Narrow Slits", Applied Physics Letters, vol. 83, No. 15, Oct. 13, 2003, pp. 3021-3023.

F.J. Garcia-Vidal et al., "Focusing light with a single subwavelength aperture flanked by surface corrugations", Applied Physics Letters, vol. 83, No. 22, pp. 4500-4502.

F. J. Garcia-Vidal et al, "Transmission and focusing of light in one-dimensional periodically nanostructured metals", Physical Review B, The American Physical Society, 66, 155412-1—155412-10, 2002.

M. M. J. Treacy, "Dynamical diffraction explanation of the anomalous transmission of light through metallic gratings", Physical Review B, 66, 195105-1—195105-11, 2002.

T. López-Rios et al., "Surface Shape Resonances in Lamellar Metallic Gratings", Physical Review Letters, vol. 81, No. 3, pp. 665-668, (1998).

Qing Cao et al., "Negative Role of Surface Plasmons in the Transmission of Metallic Gratings with Very Narrow Slits", Physical Review Letters, vol. 88, No. 5, pp. 057403-1-057403-4, (2002).

J.A. Porto et al., "Transmission Resonances on Metallic Gratings with Very Narrow Slits", Physical Review Letters, vol. 83, No. 14, pp. 2845-2848 (1999).

L. Martin-Moreno et al., "Theory of Extraordinary Optical Transmission through Subwavelength Hole Arrays", Physical Review Letters, vol. 86, No. 6, pp. 1114-1117, (2001).

Qing Cao et al., "Negative Role of Surface Plasmons in the Transmission of Metallic Gratings with Very Narrow Slits", Physical Review Letters, vol. 88, No. 5, pp. 057403-1-057403-4, (2002).

Zhijun Sun et al., "Refractive transmission of light and beam shaping with metallic nano-optic lenses", Applied Physics Letters, vol. 85, No. 4, pp. 1-4 (2004).

Zhijun Sun et al., "Role of surface plasmons in the optical interaction in metallic gratings with narrow slits", Applied Physics Letters, vol. 83, No. 15, pp. 3021-3023, (2003).

Hong Koo Kim et al, "Nano-Optic Chip Technology", Proceedings of the 2nd International Workshop on Advanced Materials for Information Technology and Applications: Organic/Inorganic Nanoelectronics and Nanophotonics, pp. 21-26, (2004).

M. Delaide et al., "Design and Application of Low-Frequency Twin Side-by-Side Phased Array Transducers for Improved UT Capability on Cast Stainless Steel Components", NDT.net, vol. 5, No. 10, (2003) http://www.ndt.net/article/v05n10/versp/versp.htm.

William L. Barnes et al., "Surface Plasmon Subwavelength Optics", Nature, vol. 424, pp. 824-830, (2003).

D.E. Grupp et al., "Crucial role of metal surface in enhanced transmission through subwavelength apertures", Applied Physics Letters, vol. 77, No. 11, Sep. 11, 2000, pp. 1569-1571.

Zhijun Sun et al., "Growth of ordered, single-domain, alumina nanopore arrays with holographically patterned aluminum films", Applied Physics Letters, vol. 81, No. 18, Oct. 28, 2002, pp. 3458-3460.

A. Degiron et al., "Effects of Hole Depth on Enhanced Light Transmission Through Subwavelength Hole Arrays", Applied Physics Letters, vol. 81, No. 23, Dec. 2, 2002, pp. 4327-4329.

Tineke Thio et al., "Giant optical transmission of sub-wavelength apertures: physics and applications", Institute of Physics Publishing, Nanotechnology 13 (2002) pp. 429-432.

T. W. Ebbesen et al., "Extraordinary Optical Transmission Through Sub-Wavelength Hole Arrays", NATURE, vol. 391, Feb. 12, 1998, pp. 667-669.

A. Krishnan et al., "Evanescently coupled resonance in surface plasmon enhanced transmission", Optics Communications 200 (2001) pp. 1-7.

Tae Jin Kim et al., "Control of optical transmission through metals perforated with subwavelength hole arrays", Optics Letters, vol. 24, No. 4, Feb. 15, 1999, pp. 256-258.

W. L. Barnes et al., "Physical origin of photonic energy gaps in the propagation of surface plasmons on gratings", Physical Review B, vol. 54, No. 9, pp. 6227-6244.

H. F. Ghaemi et al., "Surface Plasmons Enhance Optical Transmission Through Subwavelength Holes", Physical Review B, vol. 58, No. 11, Sep. 15, 1998, pp. 6779-6782.

* cited by examiner

METALLIC NANO-OPTIC LENSES AND BEAM SHAPING DEVICES

The present application claims benefit of U.S. provisional application Ser. No. 60/526,998, filed Dec. 5, 2003, which is incorporated herein by reference in its entirety.

The U.S. government may have certain rights in this invention pursuant to grant number 00014-99-0663 from the Office of Naval Research.

FIELD OF THE INVENTION

The present invention is directed generally to optical devices and more particularly to nanostructured optical devices and methods of making the devices.

BACKGROUND

Beam shaping is an important concept in optics, and is commonly involved in a variety of optical components and instruments. Focusing an optical beam through dielectric lenses is a good example, and their operation is well understood on the basis of classical optics, i.e., curved surfaces with an index contrast provide refraction and focusing of light. In terms of wave optics, the optical field emanating from a lens can be expressed as Fourier expansion of radiation from infinitesimal dipoles on an exit surface of the lens. The role of the lens is to provide a phase correction to each of the Fourier components by virtue of phase retardation resulting from path length difference. The optical fields then reassemble to a focus at some distance beyond the lens, forming an image of the dipole source.

SUMMARY

A nano-optic device comprises a plurality of subwavelength apertures in a metal film or between metal islands. The device is adapted to shape a radiation beam transmitted there through.

BRIEF DESCRIPTION OF THE DRAWINGS

FIG. 3B shows the focusing and collimation of a beam (650 nm wavelength) incident to the five-aperture lens of FIG. 3A. FIG. 3C shows focusing of a beam (650 nm wavelength) incident to a three-aperture lens. Comparison of FIG. 3C with FIG. 3B shows that the radiation components from the two outermost apertures also contribute to beam shaping. FIG. 3D show beam focusing of a 800 nm wavelength beam incident on the five-aperture array lens of FIG. 3A.

As shown in FIG. 4B, a complex beam pattern develops due to a strong diffraction effect at the lens edges.

FIGS. 12, 13, 15 and 16 are top views of devices according to embodiments of the invention.

DETAILED DESCRIPTION OF THE PREFERRED EMBODIMENTS

Figure 1:
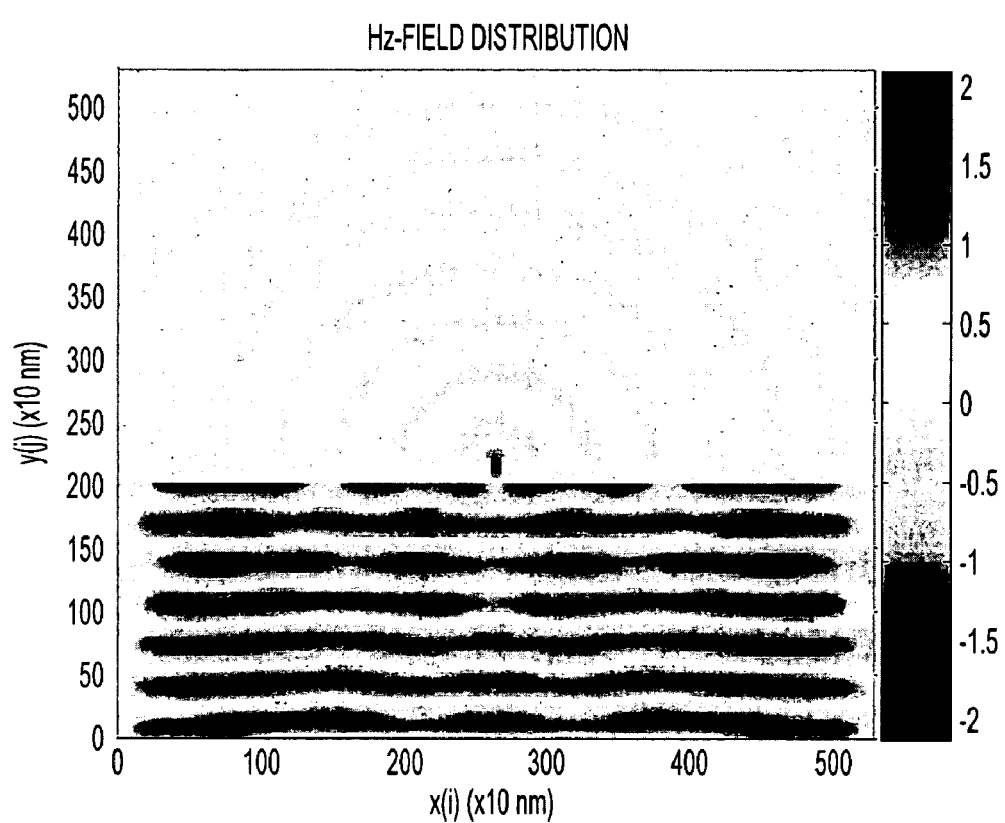
FIG. 1 is a simulation of optical transmission through a single nanoaperture formed in a silver layer.

A metallic nano-optic device possesses multifunctional capability in shaping and processing (i.e., focusing, bending, collimating, and/or spatial- and wavelength-filtering) an optical beam (i.e., a focused, unfocused or diffuse incident radiation) in a fashion that overcomes the limitations of diffractive optics. The structure comprises a nanoaperture array which is designed to transmit a light with proper phase retardation between aperture elements such that the emerging beam evolves into a desired shape as it emanates from the apertures, similar to the beam shaping with a phased-array antenna in microwaves. As used herein, the term light includes visible, ultraviolet and infrared radiation. The device utilizes the plasmonic phenomena occurring in nanoaperture arrays and preferably has spatial-, wavelength-, and/or polarization-filtering characteristic besides the beam shaping function. Finite-difference time-domain (FDTD) analysis results show that such devices are feasible in the optical frequency range. Methods of making the device are also described.

Preferably, optical beam shaping with the metallic nanoaperture array structures occurs when each nanoaperture serves as a dipole source radiating optical power at the exit surface of the metal. The dipole elements in the array are designed to have a certain phase relationship among them, primarily controlled by the path length difference and/or the effective index difference in the aperture regions. In the case of dielectric-based optical lenses, the optical field is expressed as a Fourier expansion involving an integral of continuously-distributed infinitesimal dipole sources on the lens surface. In contrast, the optical fields in the metallic nanoaperture lenses are expressed as a discrete sum of finite dipole sources. As is shown below, this metallic nano-optic structure offers unique capability in shaping and processing optical beams that are not obtained in the dielectric-based optical lenses.

Without wishing to be bound by a particular theory, the inventors believe that one of the well-known limitations in dielectric lenses, for example, is that no lens can focus light onto a size smaller than its wavelength. This can be understood in view of the fact that the infinitesimal dipole elements located distant from a lens axis do not contribute to the Fourier integral at a focus since the wave components emanating from those sources toward a focal point are non-propagating and decay exponentially due to the large values of their transverse wave vectors. In the metallic nano-optic lenses, however, the situation is quite different. Being discrete and finite, the dipole elements radiate optical power uniformly all around the radial directions. In other words, all of the nanoaperture dipoles in an array can generate propagating waves that can reach the focal point with proper phase retardation, thus contributing to image formation at a focus. This unique feature may allow the development of a novel beam-shaping methodology that overcomes the limitations of diffractive optics. For example, it may be possible to design a nanoaperture array structure such that the radiations from a discrete set of finite dipoles focuses to a size significantly smaller than the wavelength, i.e., far below the diffraction limit. It should be mentioned here that the method to make a "perfect" lens described herein is different from the one proposed by J. B. Pendry involving negative refractive index material. J. B. Pendry, *Phys. Rev. Lett.* 85: 3966 (2000).

Another distinctive feature of the nano-optic lenses stems from the blocking nature of metal in optical transmission. The maximum lateral dimension of a transmitted beam is basically determined by the aperture array dimension, and the transmitted beam profile is completely free from the diffraction effect regardless to the array size, even down to the subwavelength scale. In the dielectric lenses, however, the lens size may seriously interfere with and affect the transmitted beam profile via diffraction at the lens edges, especially when the lens dimension is reduced to a size comparable to the wavelength of light. This diffraction phenomenon is one of the limiting factors in scaling down the dimensions of conventional optics to wavelength or subwavelength ranges. The metallic nanoaperture array structures overcome these limitations, and preferably provide beam shaping at length scales down to nanometers in a discrete or array form. Besides the above described features, the nano-optic structures also offer other functionality such as wavelength- and/or polarization-filtering that are intrinsic to the structure. All these features provide multifunctional beam shaping and processing devices as described below.

FIG. 1 shows a FDTD simulation of optical transmission through a single nanoaperture formed on a metal layer; the image shows the distribution of magnetic field (Hz). A single slit (80-nm slit width) is provided in a 200-nm-thick silver layer. An optical beam (633 nm wavelength) is incident from the bottom side in the image. The wavefronts of an incident and transmitted beam are clearly resolved with a period that matches the wavelength of light in the air and in quartz, respectively. The incident light transmits through the narrow slit, although the intensity drops significantly. The wavefronts emanating from the slit are clear concentric circles with uniform intensity distribution across 0-180 degree angular range. This reveals that the nanoaperture on a metal layer serves as a finite dipole source and radiates power, in a way similar to the case of a point (or line) source in free space. It should be noted here that the slit width is about ⅛ of the wavelength. As the slit width is increased, the transmission also increases, but with a significant change in the transmitted beam profile. The angular uniformity of optical power deteriorates and a complex diffraction pattern develops.

Figure 2A:
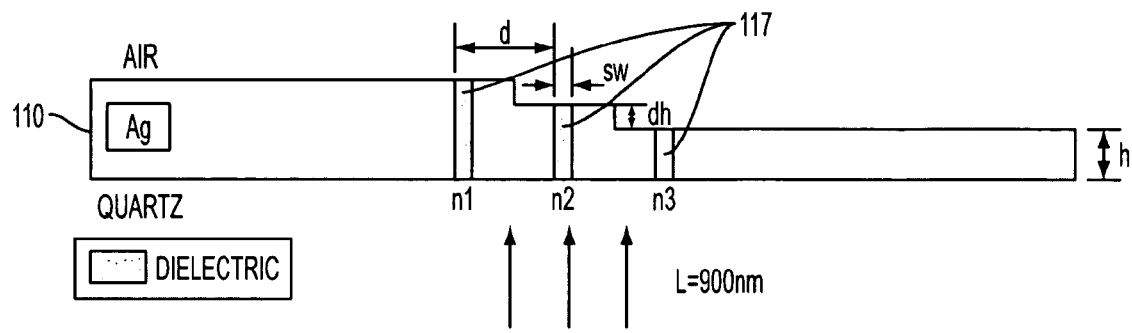
FIG. 2A is a side cross-sectional view of a device comprising a three-aperture array structure with tapered metal thickness according to an embodiment of the invention.
Figure 2B:
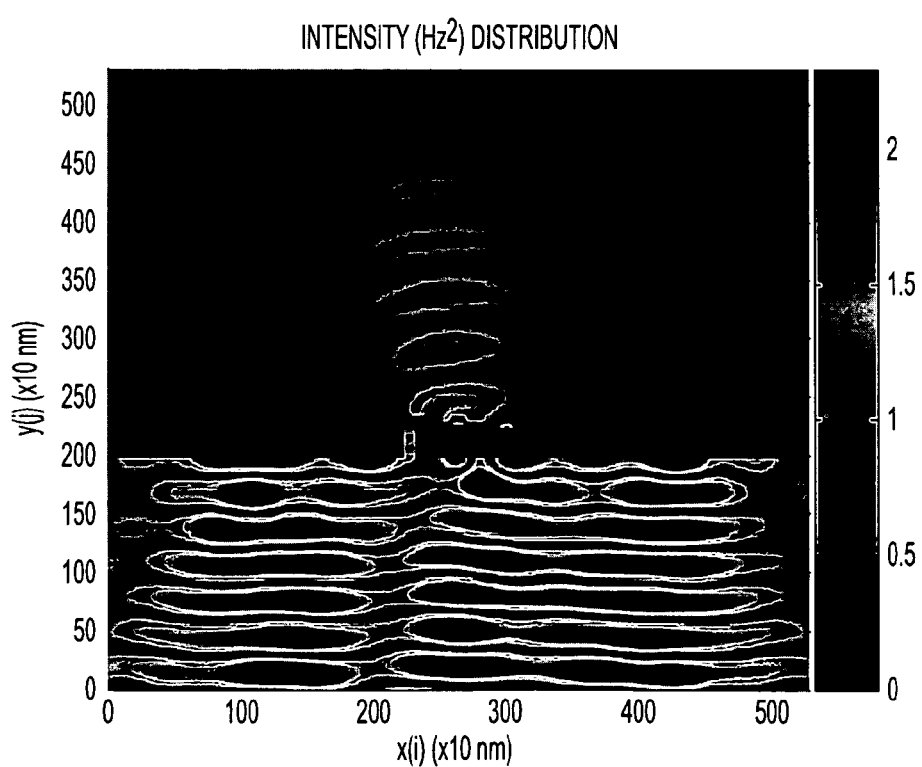
FIG. 2B is a simulation of beam propagation through the device of FIG. 2A. The beam in FIG. 2B refracts towards the thicker metal side, similar to the case of conventional dielectric lenses. The dielectric in the apertures is assumed to be air in the simulation.

FIG. 2A shows a cross-section of a three-aperture array structure 110, in which each nanoaperture 117 has different length (i.e., depth). Three slits (80-nm wide ("SW")) are introduced on a Ag layer with a 370-nm spacing ("d," center to center). The Ag layer thickness is varied with a 50-nm step profile ("dh") such that the slit depth is 250, 300, or 350 nm. The different slit depth is used to introduce phase retardation among the dipole elements at the exit surface of metal. While FIG. 2A shows a silver layer on a quartz substrate, other suitable metal and transparent substrate materials may be used. Alternatively, the substrate may be omitted and a free standing metal film may be used. FIG. 2B shows a FDTD simulation of optical transmission through the slit array. The image shows the optical intensity distribution. An optical beam (plane wave) is incident from the bottom side of the figure. Optical transmission through nanoaperture arrays involves interactions with surface plasmons, and the transmittance depends on various factors such as slit spacing with respect to wavelength, refractive index of surrounding media, metal thickness, aperture width, etc. See Z. Sun, Y. S. Jung and H. K. Kim, *Applied Physics Letters* 83, 3021 (2003), and U.S. Provisional Application Nos. 60/492,954, 60/492,955 and 60/492,956, filed on Aug. 6, 2003, and incorporated herein by reference in their entirety. The wavelength of light is chosen to match these structural parameters so that a good transmission is observed (or vice versa, the structural parameters can be designed to match a given wavelength for maximum transmission). The image clearly reveals that the transmitted beam propagates along the direction tilted towards the thicker side of metal. This behavior is very much similar to the refraction of light in classical optics. This can be understood in view of the fact that the effective refractive index in a narrow slitted metal region is higher than that in the air. Therefore the light emerging from the nanoslitted metal region refracts (bends) towards the higher index region (metal side), in the same way as a light refracts when it exits from a higher index region at a dielectric interface in ray optics. This simulation demonstrates the feasibility of beam shaping/steering with the use of the nanoaperture arrays, whose geometry is properly shaped to induce a phase correction at the exit surface.

Figure 3A:
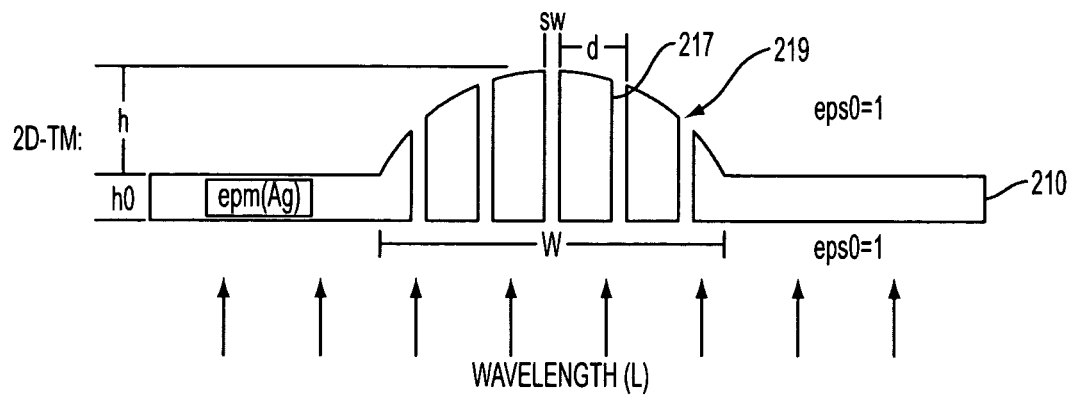
FIG. 3A is a side cross-sectional view of a device comprising a nano-apertured metal lens. The lens is a five-aperture array that has a convex profile of metal thickness.
Figure 3B:
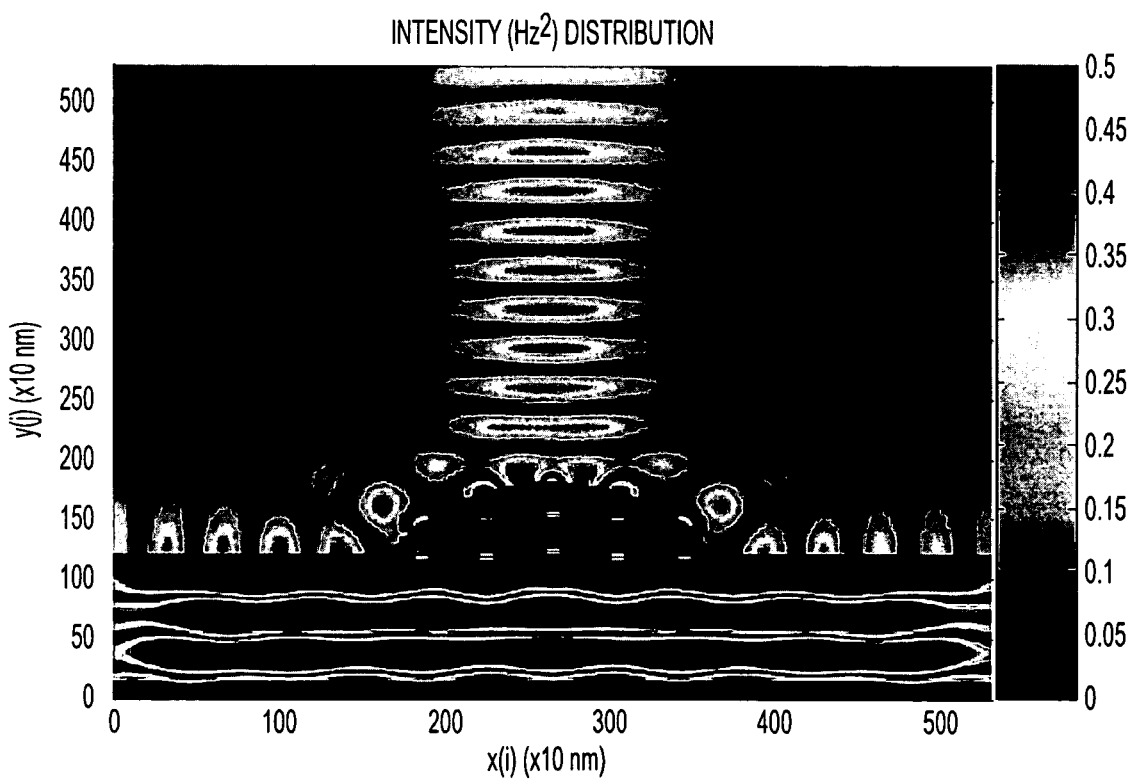
FIGS. 3B, 3C and 3D are simulations of beam propagation through various nano-aperture devices.

Based on this result, a lens structure 210 that has a convex profile in its metal thickness (aperture depth) is shown in FIG. 3A. Five slits 217 (80 nm slit width "SW") are provided in an Ag layer with 400-nm spacing (center to center). The metal thickness (slit depth) in the lens region is designed to vary in a half-elliptical profile: the slit depth in the array is 250, 320, 400, 320, and 250 nm. The diameter of the convex region 219 is 2 microns (the diameter of the aperture array is 1.7 microns). FIG. 3B shows a FDTD simulation of optical transmission (at 650 nm wavelength) through the nano-optic lens structure (i.e., an image of the optical intensity distribution). The image shows that the incident beam is well focused and collimated after the nanoaperture lens. The beam size (full-width-half-maximum) is measured to be ~700 nm, about the same as the wavelength of light. It should also be noted that the beam remains well collimated with negligible divergence even after many wavelengths of propagation in the far field regime.

Figure 3C:
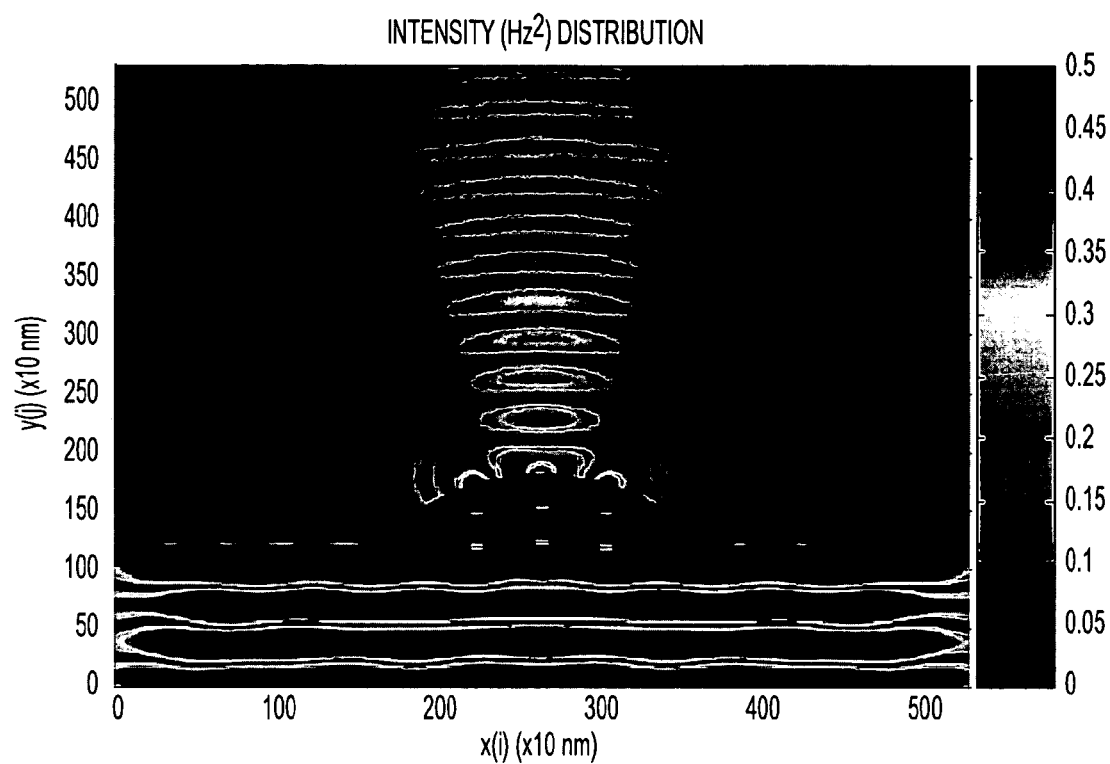

In order to check the contributions from each aperture (especially from the outer ones) in this beam shaping, the two outermost apertures in the five-aperture lens structure were deleted in the simulation. FIG. 3C shows the optical transmission through a three-aperture lens structure at 650 nm wavelength. The focusing effect became stronger while the collimation effect was lost. This simulation demonstrates that the radiation components from the outer apertures also reach the far-field region and contribute to beam shaping with proper phase retardation, whose amount is basically controlled by the lens thickness in this particular design.

Figure 3D:
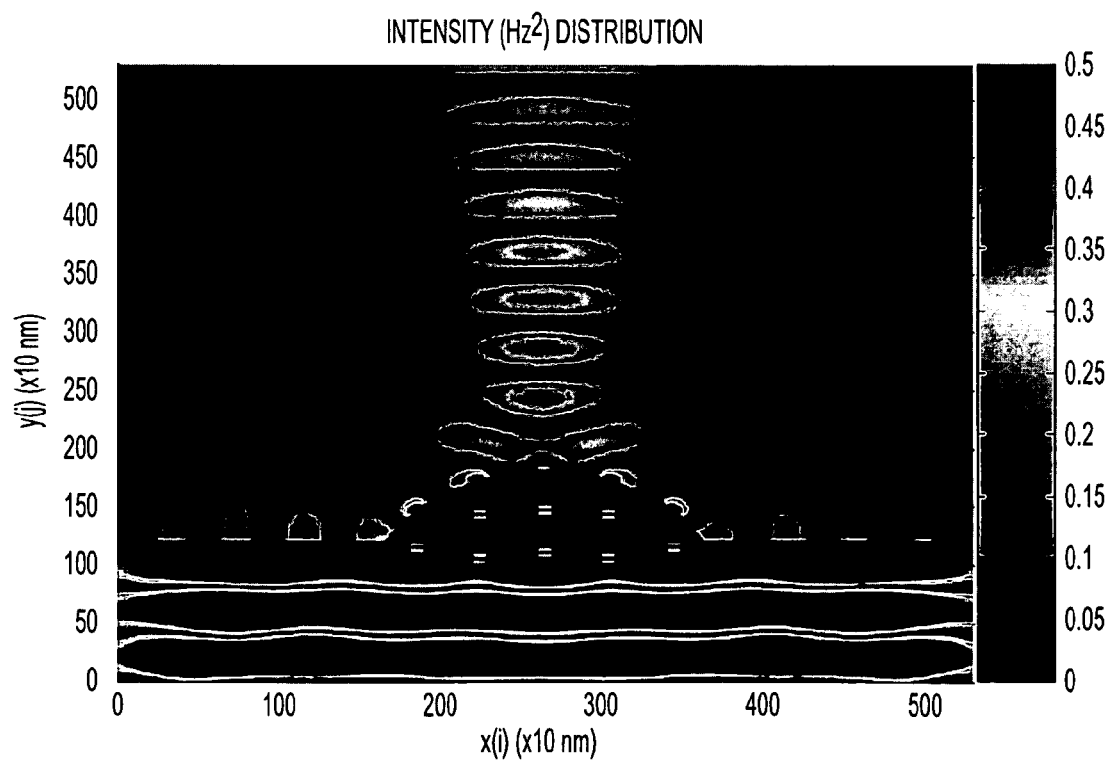

Changing the operating wavelength is expected to alter the phase retardation among the nanoapertures. FIG. 3D shows a FDTD simulation with the five-aperture lens at 800 nm wavelength. Compared to the case of operation at 650 nm wavelength (shown in FIG. 3B), the transmitted beam shows a more focused profile with a minimum beam waist of ~400 nm. The change in phase retardation among the apertures is visually confirmed in the beam propagation characteristic in the aperture regions. The fringe spacing in each nanoslit, for example, is basically determined by the effective refractive index and the wavelength. Comparison of FIGS. 3B and 3D reveals that the fringe spacing at 800 nm wavelength is noticeably larger than that at 650 nm, implying that the phase retardation between neighboring apertures decreased at longer wavelength. The fringe spacing in the nanoaperture regions is smaller than that in air region at each wavelength. This confirms that the effective refractive index in the nanoaperture region is higher than that in the air, as expected from an understanding of the plasmon phenomena in nanostructures. Shifting the operating wavelength will not only change the phase relationship between apertures but also will alter the transmitted power through each aperture. See Z. Sun, Y. S. Jung and H. K. Kim, *Appl. Phys. Lett*. 83, 3021 (2003).

The dependence of optical transmission (magnitude and phase) on the wavelength and structure may be taken into account in designing the nano-optic lens structures that produce desired beam profiles. The optical fields (the magnetic field $H_z$) in the far-field regime of a beam transmitted through the nanoslit array can be expressed as a summation of the cylindrical waves from each nanoslit element.

$$H_z(x, y) = \sum_\alpha \frac{A_\alpha}{\sqrt{r_\alpha}} e^{i\phi_\alpha} e^{ik_0 r_\alpha} \qquad (1)$$

Here, $r_\alpha = \sqrt{(x-x_\alpha)^2+(y-y_\alpha)^2}$, and $k_0$ is the wavevector of the transmitted beam in the air region. $A_\alpha$ and $\phi_\alpha$ are respectively the amplitude and phase of the radiation component emanating from the $\alpha$-th slit located at $(x_\alpha, y_\alpha)$, and are expressed as follows, if we neglect coupling between the slits.

$$A_\alpha = \left| \frac{\tau_{\alpha 01} \tau_{\alpha 12} e^{ik_\alpha h_\alpha}}{1 + \rho_{\alpha 01} \rho_{\alpha 12} e^{i2k_\alpha h_\alpha}} \right| \qquad (2)$$

$$\phi_\alpha = \phi_{\alpha 01} + \phi_{\alpha 12} + n_1 k_0 h_\alpha - \theta_\alpha \qquad (3)$$

Here, $\rho_{\alpha 01}$ and $\rho_{\alpha 12}$ are the reflectivity of surface plasmon wave at the air-metal and metal-substrate interfaces of the $\alpha$-th slit, respectively, and are given as $\rho_{\alpha 01}=(n_0-n_{1\alpha})/(n_0+n_{1\alpha})$ and $\rho_{\alpha 12}=(n_{1\alpha}-n_2)/(n_{1\alpha}+n_2)$. $\phi_{\alpha 01}=\arg(\rho_{\alpha 01})$ and $\phi_{\alpha 12}=\arg(\rho_{\alpha 12})$. $\tau_{\alpha 01}=1-\rho_{\alpha 01}$ and $\tau_{\alpha 12}=1-\rho_{\alpha 12}$. The complex refractive index $n_{1\alpha}$ relates the surface plasmon wavevector $k_\alpha$ in the $\alpha$-th slit region to the wavevector in the air region ($k_\alpha = n_{1\alpha} k_0$), and $n_0$ and $n_1$ are the refractive indices in the air and dielectric substrate, respectively. $\theta_\alpha = \arg(1+\rho_{\alpha 01}\rho_{\alpha 12} e^{i2k_\alpha h_\alpha})$. $h_\alpha$ is the depth of the $\alpha$-th slit. In general, both the amplitude ($A_\alpha$) and phase ($\phi_\alpha$) are complex functions of the structural and materials parameters (such as slit width, depth and spacing, and dielectric constants) and the operating wavelength relative to slit spacing.

Figure 3E:
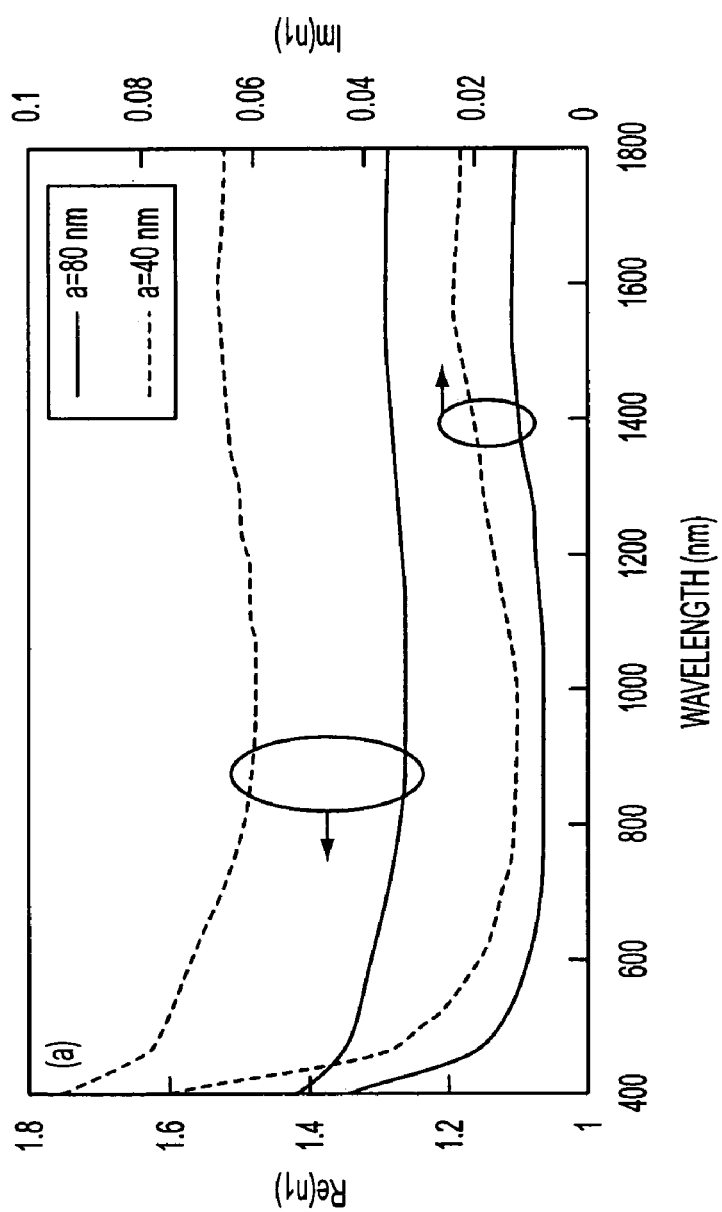
FIG. 3E is a plot of a complex index $n_1$ versus beam wavelength for a 40 nm aperture slit (dashed line) and 80 nm aperture slit (solid line).
Figure 3F:
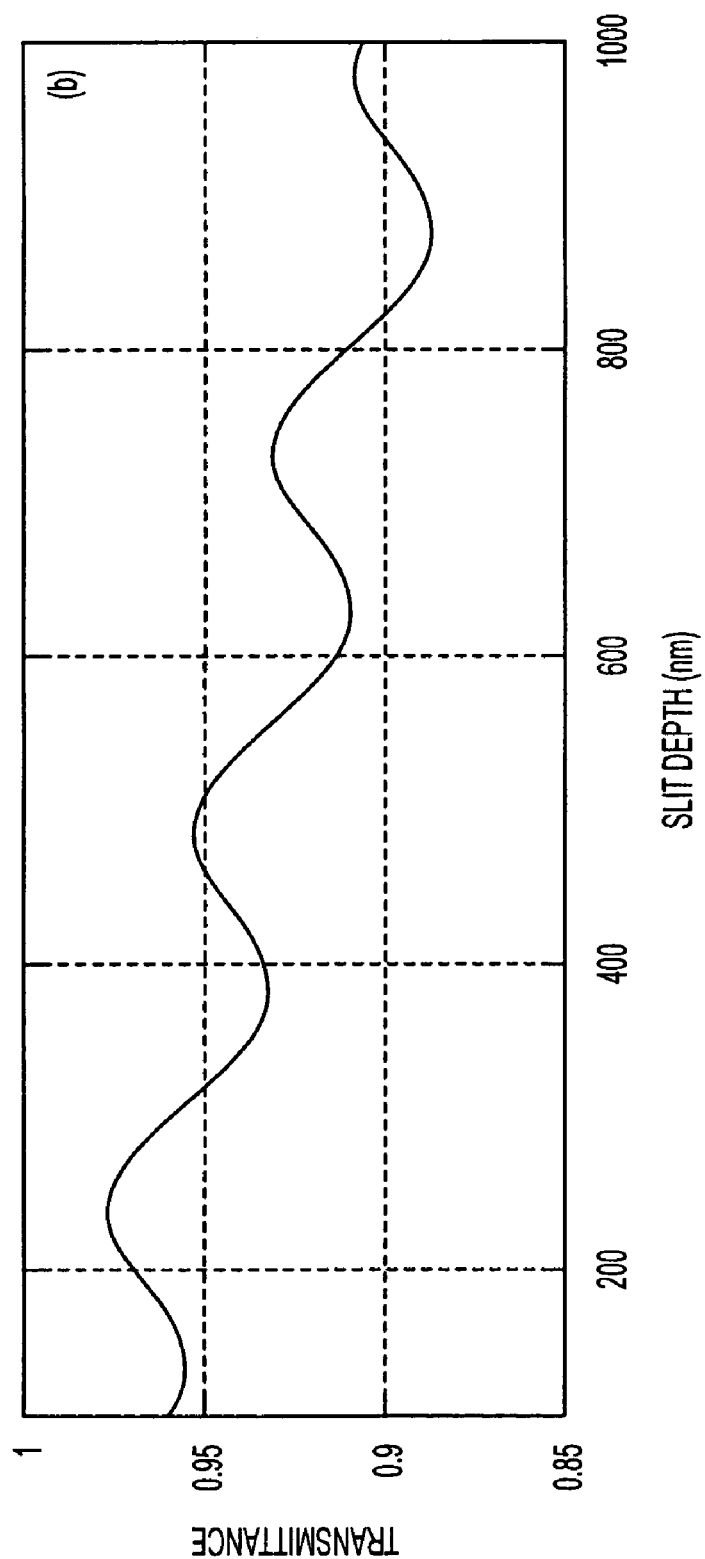
FIG. 3F is a plot of transmittance versus slit depth.
Figure 3G:
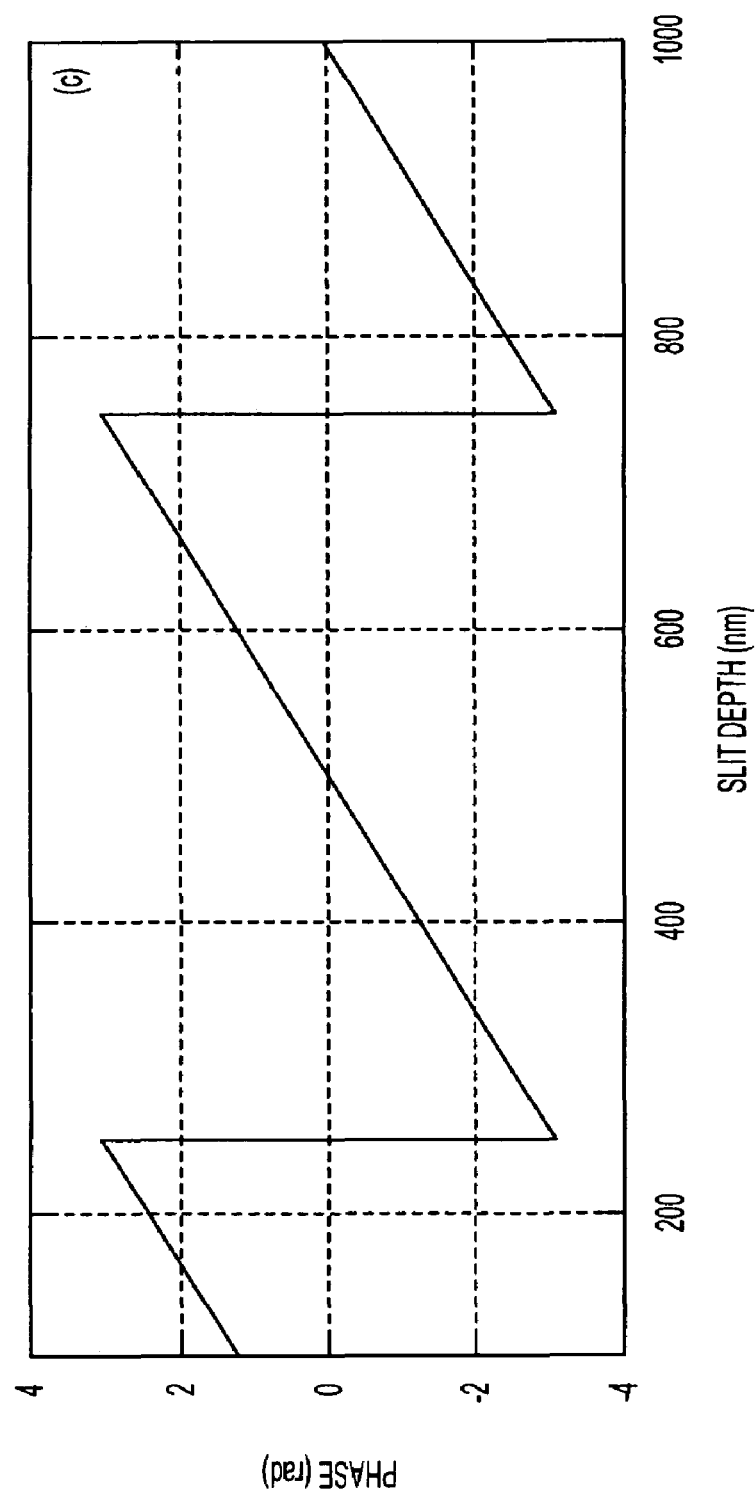
FIG. 3G is a plot of phase versus slit depth.

In order to attain a quantitative understanding, the inventors calculated the surface plasmon wavevector in the nanoslit region and thus the complex index $n_1$ (FIG. 3E). For a 80-nm-wide slit formed in silver, $n_1$ is calculated to be 1.3+i0.01 at 650 nm wavelength. As the slit width is reduced, both the real and imaginary parts of index $n_1$ increase, indicating that the portion of the surface plasmon field in the metal region grows. In the regime that no resonance coupling occurs between surface plasmon waves localized at each slit, both the amplitude ($A_\alpha$) and phase ($\phi_\alpha$) of optical field are primarily determined by slit depth (i.e., metal thickness). FIGS. 3F and 3G show slit depth (i.e., thickness) dependences calculated using the formula described above. In the case of 80-nm-wide slits, the amplitude is found to remain nearly constant over a broad depth (thickness) range, i.e., with a maximum variation of 0.91 to 0.98 for the metal depth (thickness) of 100 to 1000 nm. The periodic fluctuation of amplitude indicates the Fabry-Perot resonance of surface plasmon wave in the nanoslit region. The calculation also shows that the phase of optical field is linearly proportional to slit depth. In this regime (a uniform power distribution among slits and the linear dependence of phase on slit depth), it can be shown that the transmitted waves through the nanoslits will beam into the direction that satisfies the following phase matching condition at the metal/air interface: $k_{sp} \sin\theta_i = k_0 \sin\theta_t$. Here $\theta_i$ is the incidence angle of the surface plasmon wave to the hypothetical planar surface that comprises the slit apertures, and $\theta_t$ is the tilt angle of the transmitted beam. This formula basically tells that light will refract at the nanoapertured metal surface in the same manner as in the case of dielectric interfaces. It should be noted that the slit spacing in this design is smaller than the wavelength of light. Therefore, no grating diffraction effect is involved in the optical transmission through the nano-optic structure, unlike the diffractive optics case. The FDTD simulation result demonstrates that the nanoslit arrays with tapered metal thickness possess the capability of beam shaping in a way that resembles the dielectric-based refractive optics (i.e., refraction through curved surfaces) but that is distinctively different from the conventional optics in its mechanism (i.e., transmission of optical power through metal via the surface plasmon waves propagating through the nanoslit arrays).

Figure 4A:
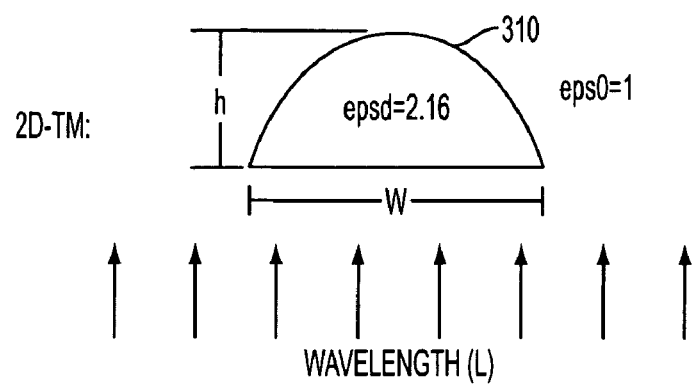
FIG. 4A is a side cross-sectional view of a prior art micron-scale dielectric lens.
Figure 4B:
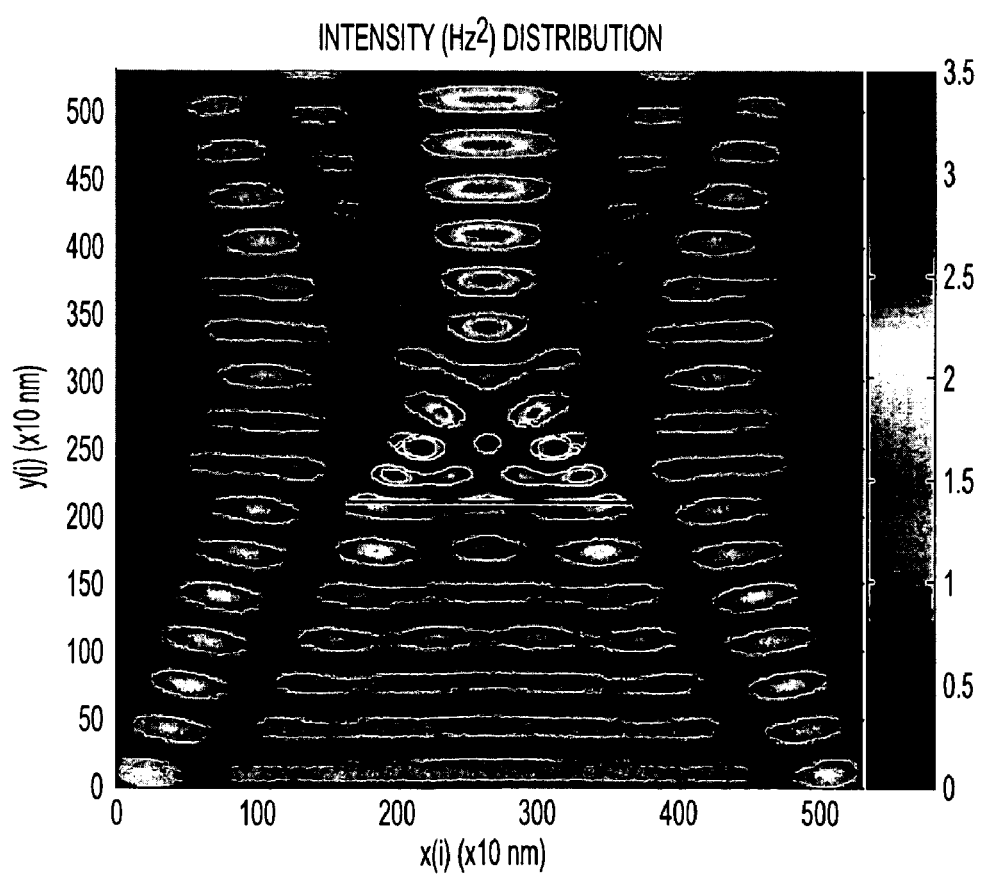
FIG. 4B is a simulation of beam propagation through the lens of FIG. 4A.

In order to compare the beam shaping performance of the nanoaperture array device with that of conventional dielectric lenses, the inventors simulated the optical transmission through a dielectric lens structure. FIG. 4A shows a cross-section of a glass lens 310, whose dimension is approximately the same as the nanoaperture array shown in FIG. 3A: 2 micron lens width (diameter) and 600 nm lens height (the thickness at center). A beam (650 nm wavelength) is incident from the bottom side in the image shown in FIG. 4B. The transmitted beam shows a strong diffraction effect at the lens edges, although a focusing effect is also evident in the center region. The edge diffraction effect becomes even more serious as the lens width is further reduced to a wavelength or smaller. This is a big contrast to the nanoaperture lens case, in which the edge effect is intrinsically absent due to the blocking nature of metal in the outside the array region and also due to the discrete dipole (point source like) nature of radiation from the nanoapertures.

The beam-shaping functions of the nanoaperture array device may be used in any suitable fields or devices that involve optics.

For example, the capability of focusing an image into a size much smaller than the wavelength of light means that the device may be used in optical lithography and patterning and imaging beyond the diffractive optics. In other words, the nano-optic beam shaping devices, such as the focusing and/or collimating lenses described herein, are incorporated into a lithography exposure system to focus the exposing beam, such as a visible or UV radiation beam, onto a photosensitive layer, such as a positive or negative photoresist layer. The radiation beam may optionally be passed through a photo mask before being incident onto the nano-optic beam shaping device. The exposed photosensitive layer is then patterned to form a mask, and then the device layer(s) underlying the mask is wet or dry etched to form a corresponding pattern in the underlying layer or layers. Thus, any suitable device, such as a semiconductor or other solid state device, such as transistors, capacitors, fuses, etc. may be patterned using this lithography method. Any one or more layers, such as semiconductor, conductive (i.e., metal or polysilicon) or insulating layers, in these devices may be patterned using this method.

The capability of beam shaping and collimating of an optical beam at wavelength or subwavelength scale without being affected by the edge diffraction effect means that the device can also be used in optical instrumentation that involves beam coupling and light detection in compact space (both in the beam propagation direction and the transverse direction) and in scaleable large size arrays. The focused beam spot size may range from 10 nm to 800 nm, such as 100 nm to 750 nm or 10 nm to 100 nm.

The nanoslit arrays (i.e., arrays with slit shaped apertures) also show strong polarization and wavelength dependence in optical transmission, and this can be utilized as a polarization and wavelength filter as an integral part of the lens, collimator or beam bending device, as will be described in more detail below.

The nano-optic beam shaping/lensing concept can be extended to the 2D nanoaperture (hole) array structures, although the FDTD simulations shown in the figures were carried out for the 1D arrays for computational convenience. In the 1D nanoslit arrays described above, beam shaping (focusing for example) is designed to occur along the direction parallel to the grating vector direction. In other words, focusing occurs along the polarization direction. In alternative designs of lens structure, beam shaping can be designed to occur along the direction perpendicular to the polarization direction. This latter configuration will be useful for controlling fast-axis divergence of laser diode beams, in which case the laser beam is usually TE polarized and the beam diverges fast along the direction perpendicular to the polarization direction.

Overall the proposed nanoaperture structures are promising for developing ultracompact, multifunctional optical components and instruments. The nanoaperture structures (non-uniform thickness profiles of metal) can be implemented by combining a microfabrication process with the nanofabrication methods described by H. K. Kim et al., U.S. Provisional Application Nos. 60/492,954, 60/492,955 and 60/492,956 filed on Aug. 6, 2003 and incorporated herein by reference in their entirety.

Figure 5:
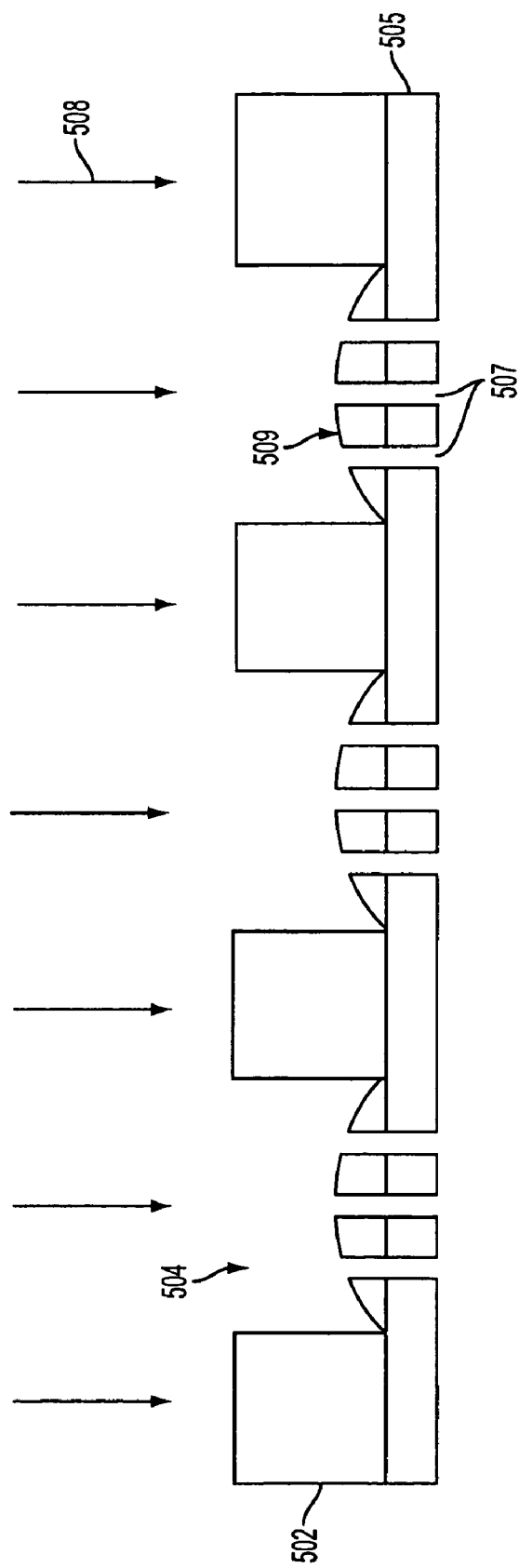
FIG. 5 illustrates a schematic side cross-sectional view of a method of forming a non-uniform thickness profile of metal on nanoaperture (hole or slit) arrays.

FIG. 5 below illustrates a schematic method of forming a nonuniform thickness profile of metal on nanoaperture (hole or slit) arrays. A shadow mask 502 with micron scale apertures 504 is placed on top of a flat nanoaperture array substrate, such as a metal sheet of film 505. Deposition of metal 508 on the substrate 505 is performed using the shadow mask 502. Due to the finite thickness of a mask, the metal deposited through the apertures will show nonuniform, usually convex, thickness profiles 509. The convex metal portions are preferably, but not necessarily, deposited over a flat metal film substrate 505. After the shadow mask is removed, the nanoapertures 507 are formed in the metal by photolithography or other suitable methods, as described in more detail below.

Figure 6A:
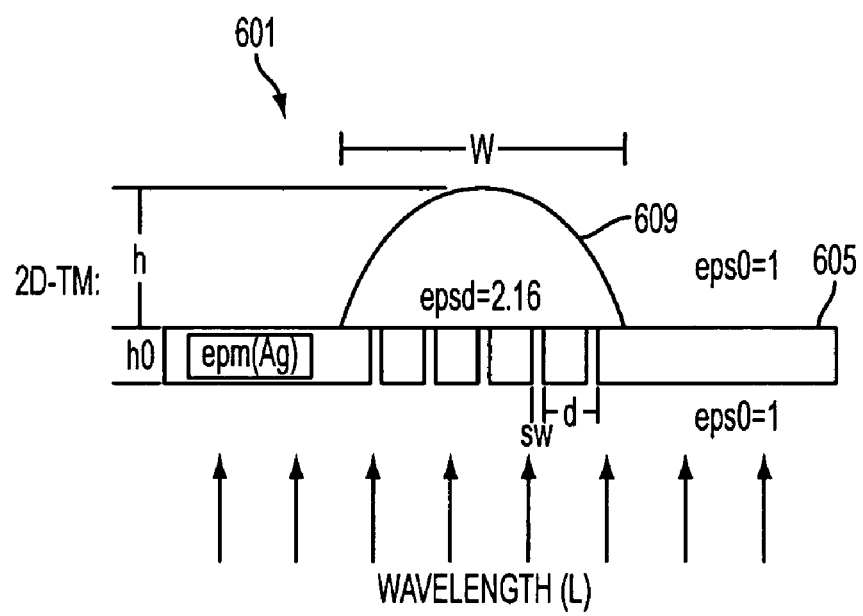
FIGS. 6A and 6B illustrate side cross-sectional views of devices according to an embodiment of the invention in which a micron-size dielectric lens attached to a nanoaperture array.
Figure 6B:
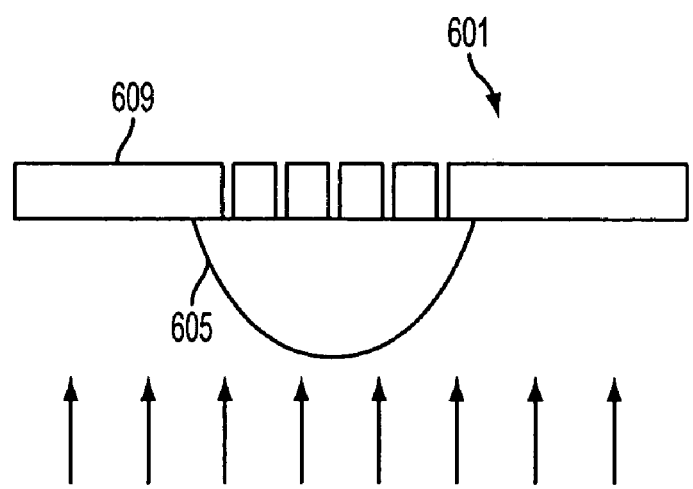

FIG. 6A illustrates an alternative embodiment of a device 601 where a micron-size dielectric lens 609, such as a glass, plastic, epoxy, quartz or transparent ceramic lens, is attached to a nanoaperture array 605 that preferably, but not necessarily, has a flat or uniform metal thickness. The lens may be attached to the metal film 605 by any suitable method, such as by a transparent adhesive, by mechanical attachments, by compression bonding and/or thermal bonding. The phase correction function is performed by the dielectric lens part while the nanoaperture array provides a discrete set of dipoles that radiate power as a point (or line) source. The light can be incident from the metal side as shown in FIG. 6A or from the dielectric lens side as shown in FIG. 6B. The latter configuration is expected to perform more closely to the nanoaperture lens concept described herein.

Figure 7:
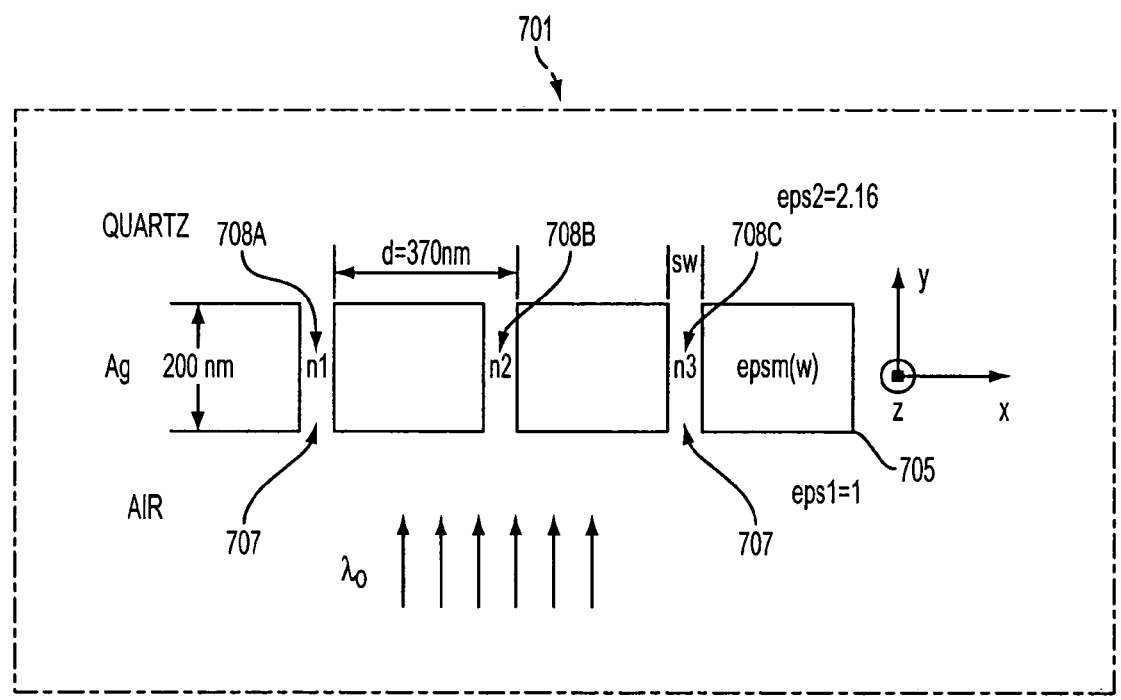
FIG. 7 illustrates a side cross-sectional view of a device according to an embodiment of the invention in which the nanoapertures are filled with dielectric materials having different refractive indexes.
Figure 8:
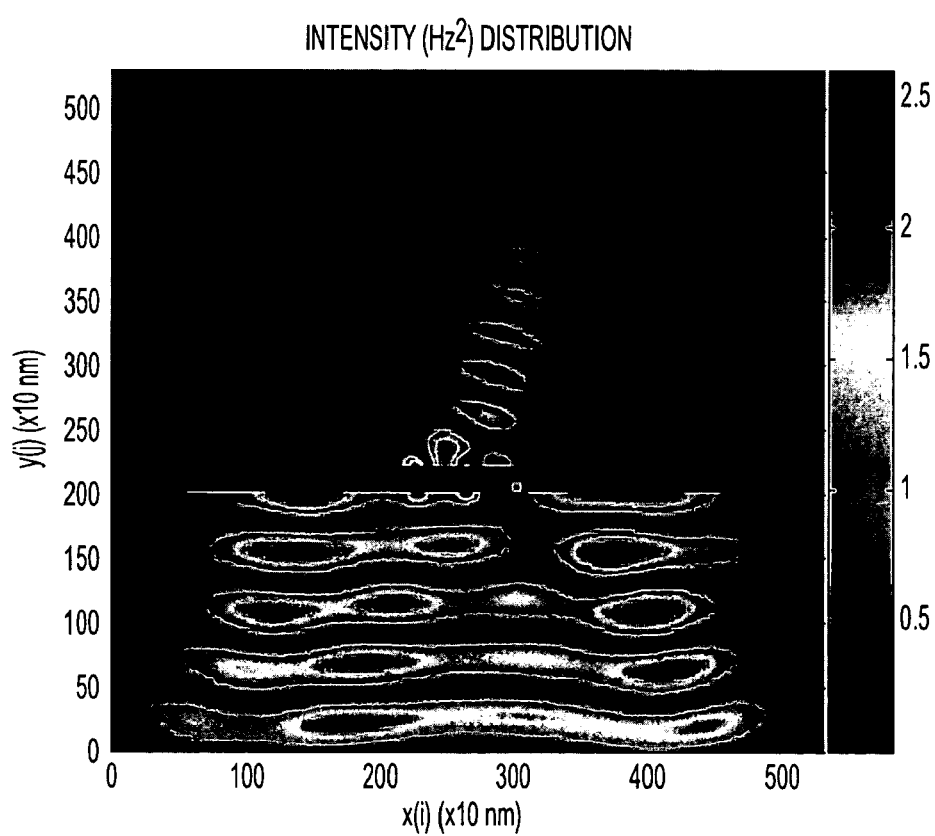
FIG. 8 is a simulation of beam propagation through the device of FIG. 7.

FIG. 7 shows an alternative device 701 where the inside of the nanoapertures 707 are filled with dielectric materials 708A, 708B, 708C whose refractive indices are properly modulated such that proper phase retardation results during transmission through the apertures. In other words, the apertures are filled with dielectric materials having different refractive indexes. Alternatively or in addition, a layer (or layers) of dielectric with spatially-modulated dielectric constant can be placed on top and/or bottom surface of nanoaperture array 705. In other words, a layer of dielectric contains regions of different refractive index overlying different apertures 707. In the FDTD simulation shown in FIG. 8, the refractive index of materials 708A, 708B, 708C in the apertures is assumed to be 1.2, 1.6 and 2.0 respectively from the left. Note that the transmitted beam refracts towards higher index region. In an alternative aspect of the invention, one or more materials whose dielectric properties, such as the refractive index value, are tunable with an external field (voltage) applied across the dielectric region, are provided in the apertures 707 and/or as one or more layers above and/or below the apertures 707. The phase retardation through each aperture can then be changed by controlling the voltages, and variable/tunable beam shaping functions can be achieved without altering the geometry of the aperture array structure. Besides the time domain modulation, dielectric properties can be modulated in a spatial domain utilizing the intensity dependent index change (such as the case of photorefractive effects) of certain dielectric materials. This can be utilized in defining lens profiles (index profiles and thus beam shaping functions) in a programmable fashion. For example, tunable dielectric materials, such as nematic liquid crystal materials whose refractive index and dielectric constant are changed by an applied voltage, and control methods described in U.S. published application No. 20030128949, incorporated herein by reference in its entirety, may be used.

Different refractive index materials may be incorporated into different apertures by a lift-off method which includes selectively masking some but not all apertures by a first photoresist layer, depositing a first refractive index material into the exposed apertures and over the first photoresist layer, lifting off the first photoresist layer, forming a second photoresist layer masking the filled apertures, depositing a different second refractive index material into the exposed apertures and over the second photoresist layer, and lifting off the second photoresist layer. Alternatively, the photoresist layers may be used as a mask to selective etch the different refractive index materials out from different apertures rather than for a lift off method.

Figure 9:
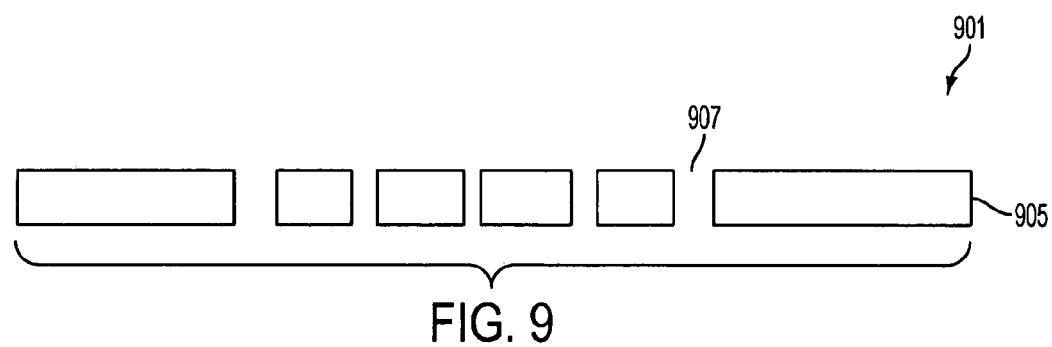
FIG. 9 illustrates a side cross-sectional view of a device according to an embodiment of the invention in which the aperture width (or diameter) is modulated such that the effective refractive index can be properly altered, while keeping the metal thickness and aperture period constant across the transverse directions.

FIG. 9 shows an alternative structure 901 where the aperture 907 width (or diameter) in the metal film 905 is modulated such that the effective refractive index can be properly altered, while keeping the metal thickness and aperture period constant across the transverse directions. This design utilizes the plasmon characteristic in a nanoaperture structure that the smaller the aperture width, the higher the effective refractive index in the aperture region.

Figure 10:
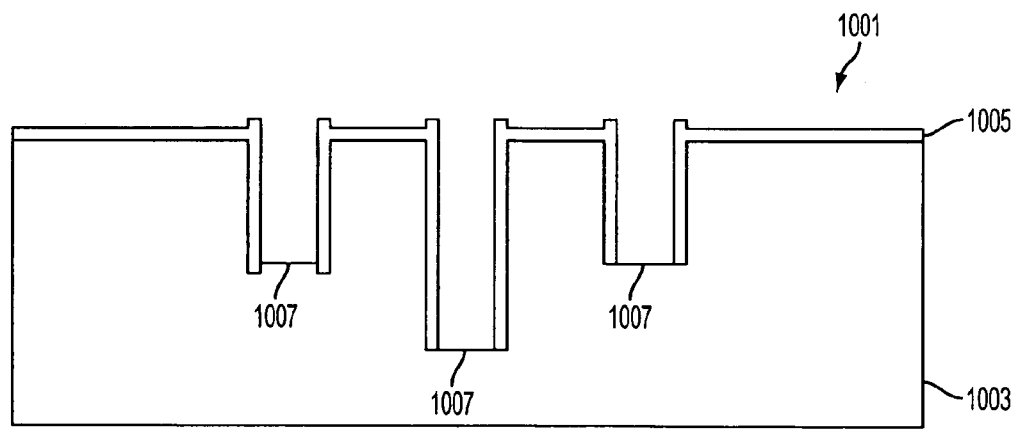
FIG. 10 illustrates a side cross-sectional view of a device according to an embodiment of the invention in which metal islands are separated by nano apertures having a different depth or length.

FIG. 10 below shows an alternative structure 1001 where metal islands 1005 on a transparent substrate 1003 are separated by nanoapertures 1007 having a different depth or length. To form this structure, first, a trench (or a hole) profile of different etch depths is developed on a transparent dielectric substrate 1003. A metal coating 1005 is provided on the surface and side walls of the dielectric trenches by any suitable method such as angled deposition, as described in more detail below.

In another alternative configuration, the beam shaping nano-optic device structure is a combination of structures shown in FIGS. 2, 3, 6, 7, 9 and/or 10. In other words, any two or more of different depth apertures in metal islands or metal film, a dielectric lens above the apertures, different dielectric constant materials in and/or above different apertures and different width apertures may be used in the same device to enhance the beam shaping characteristics of the device.

The nano-optic structure preferably includes a metal film or a plurality of metal islands, having a plurality of openings or apertures, each opening or aperture having a width that is less than a first peak wavelength of incident radiation to be provided onto the film or islands. It should be noted that the term "each aperture" does not preclude the structure from including other openings or apertures having a width that is greater than the first peak wavelength. The metal film or islands are configured such that the incident radiation is resonant with at least one plasmon mode on the metal film or metal islands, thereby enhancing transmission of radiation having at least one second peak wavelength through the openings or apertures. For incident radiation having multiple peak wavelengths, the first peak wavelength is the median peak wavelength. The nano-optic structure preferably comprises a lens and a method of focusing a radiation beam comprises passing the radiation beam through the lens comprised of a metal film or a plurality of metal islands having a plurality of apertures, each aperture having a width that is less than a peak wavelength of the incident radiation, such that the beam is focused to a spot size that is the same as or smaller than the peak wavelength of the radiation beam.

Figure 11:
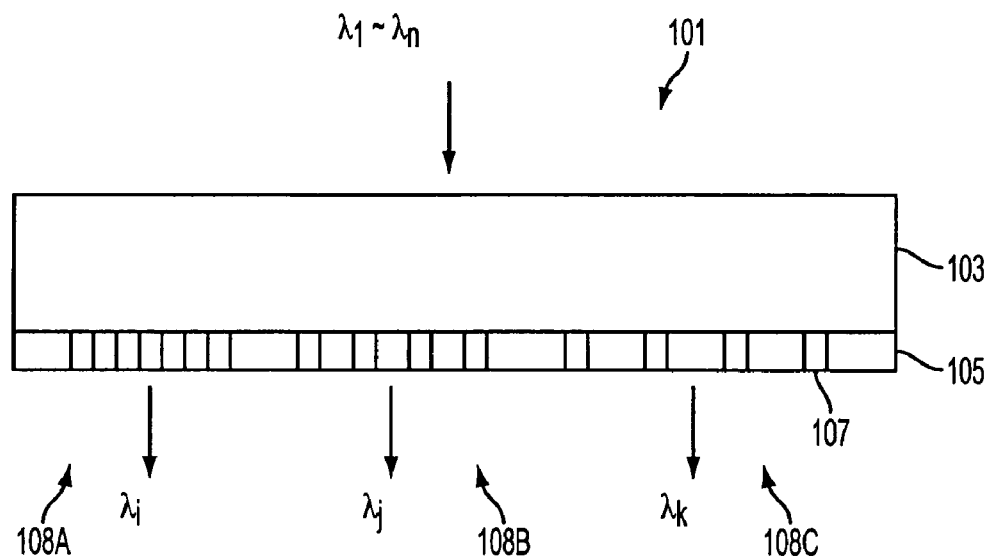
FIGS. 11, 15 and 17 are side cross-sectional views of devices according to embodiments of the invention.
Figure 12:
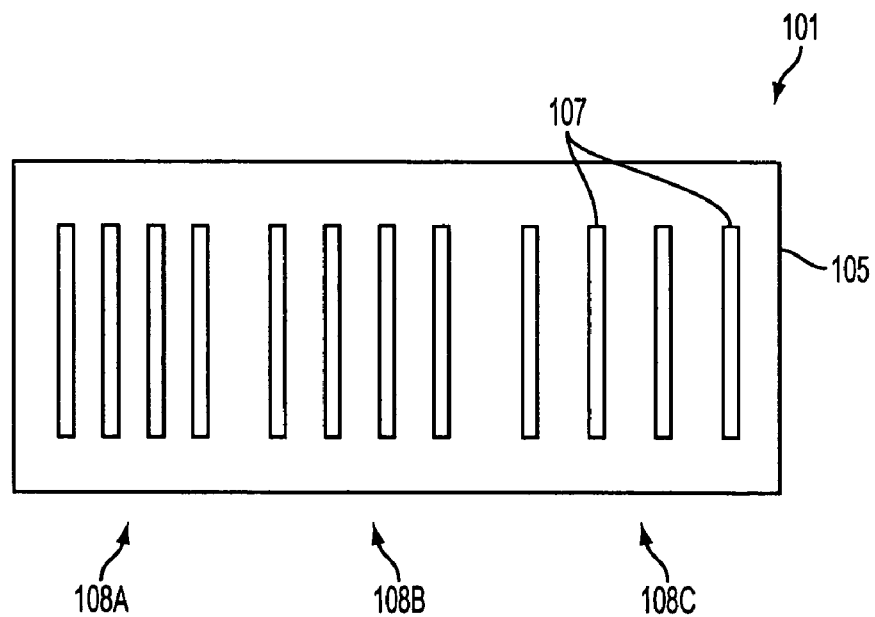

The beam shaping nano-optic device described above may also comprise a wavelength separation device or filter or it may be used in combination with a nano-optic wavelength separation device described below. FIG. 11 is schematic illustration of wavelength separation using a stacked one dimensional (1D) slit array as a micron-scale monochromator or wavelength separation device 101. FIG. 12 illustrates the top of the device 101. As shown in FIG. 11, incident radiation having a range of wavelengths $\lambda_1$ to $\lambda_n$ is provided onto a metal film 105 having a plurality of openings 107. The openings have a width that is less than at least one wavelength of incident radiation, such that the incident radiation is resonant with at least one plasmon mode on the metal film. The transmitted radiation is provided through the plurality of openings such that the transmitted radiation is simultaneously separated into a plurality of passbands having different peak wavelengths $\lambda_i$, $\lambda_j$, and $\lambda_k$. The incident radiation may be provided onto either side of the film 105.

The wavelength separation device 1, 11 201 (as described below) or 101 may comprise the nano-optic beam shaping device by varying the depth of the apertures, by filling or covering different apertures with different refractive index transparent dielectric materials and/or by varying the width of the apertures. Alternatively, the wavelength separation device may be used in combination with the nano-optic beam shaping device described above, where the incident radiation is first passed through device 1, 11, 101 or 201 and then the transmitted radiation is passed through the beam shaping device.

Preferably, radiation having a peak wavelength less than 700 nm, such as 400 nm to 700 nm (i.e., visible light) is used as the incident radiation. In this case, the apertures or openings have a width of 700 nm or less, such as 15 to 200 nm, preferably 40 to 60 nm. In the case of incident radiation with longer wavelengths, such as infrared radiation, the openings may have a proportionally larger width.

Figure 13:
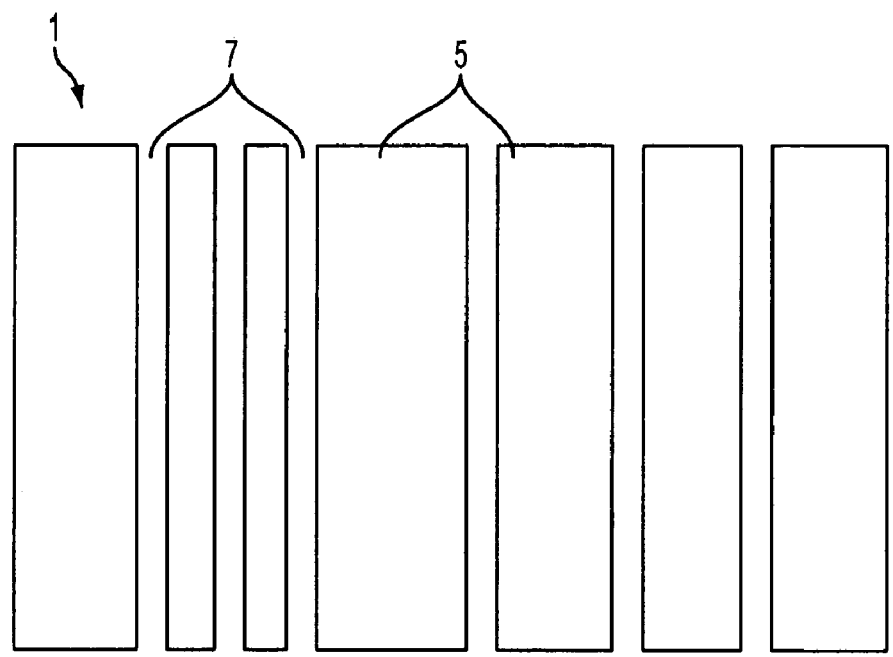

In this device 101, a metal layer or film 105 is formed over a radiation transparent substrate 103. However, a free standing metal membrane film without a supporting substrate or metal islands on a substrate may be used instead. For example, FIG. 13 illustrates a wavelength separation device 1 containing metal islands 5 separated by transparent regions 7.

Figure 14:
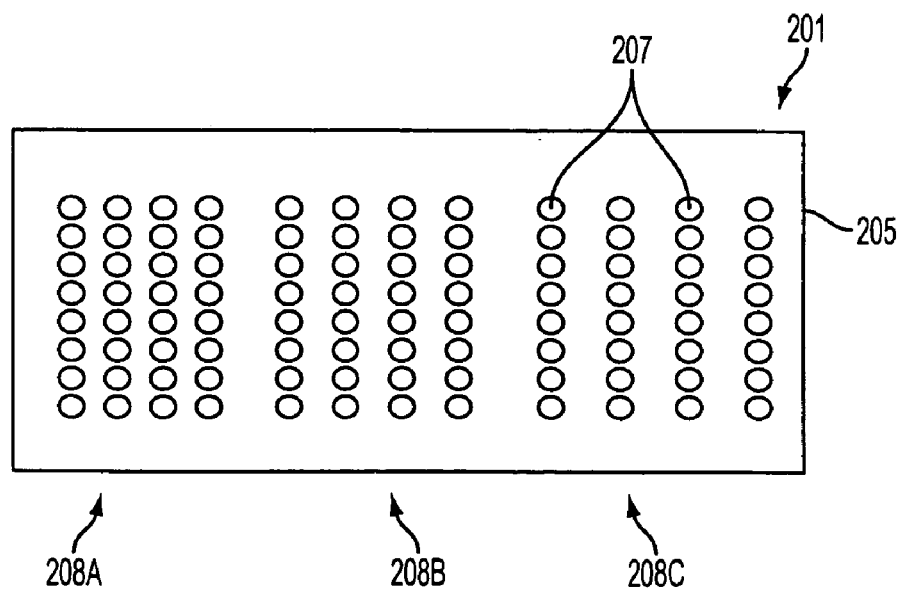

The metal film 105 contains slit shaped openings 107 that are periodically arranged with a cellular pattern. The slits preferably have a length that is at least ten times larger than the width. However, the openings 107 may have any other suitable shape, such as round, oval, polygonal or irregular shape. For example, FIG. 14 illustrates a device 201 containing a metal film 205 with groups of round openings 207 arranged in cells 208A, 208B and 208C.

The metal film 105 is divided into a desired number of cells or regions 108, such as at least two cells, where the grating period of the openings 107 is substantially the same within each cell. However, the grating period of the openings 107 differs between cells. In other words, the openings 107 in each cell are spaced apart from adjacent openings in the cell by about the same distance. However, this distance is different for different cells. For example, three cells 108A, 108B and 108C are illustrated in FIG. 11.

The grating period of the openings 107 in each cell 108 is designed to produce a passband at a certain peak wavelength in the transmission spectrum. Thus, a transmission of the radiation having one peak wavelength is enhanced due to the period of the openings in the first cell 108A. A transmission of the radiation having a different peak wavelength is enhanced due to the different period of the openings in the second cell 108B.

Preferably, the device 101 contains at least ten cells, more preferably at least 30 cells, such as 30 to 1,000 cells. A period of openings in each of the cells is different than periods of openings in each of the other cells. The transmission of passband radiation having a different peak wavelength through openings in each cell is enhanced due to the period of the openings in the respective cell. Preferably, the passband radiation transmitted through each cell 108 has a peak wavelength that differs by at least 10 nm, such as 10 to 100 nm, from peak wavelengths of radiation transmitted through the other cells 108.

The propagation length of surface plasmons is estimated to be about 5 to about 10 microns. A cell size comparable to this number or larger is preferred because it allows sufficient plasmon interaction. A 10-μm cell, for example, corresponds to about 30 periods of gratings when 0.5-μm peak passband wavelength is assumed. The cell size may be greater than 10 microns, such as 10 to 10,000 microns, for example, and the number of gratings per cell varies by cell size and peak passband wavelength.

A cell 108 size of about 10 microns, such as 5-20 microns is preferred because it matches a typical pixel size of commercially available CCD devices. For high array density (i.e., for better spatial resolution), it is desirable to keep the cell size as small as possible. However, for ease of fabrication, the cell size may be increased to about 50 to 500 μm.

Preferably, a period of openings in each cell ranges from about 250 nm to about 700 nm and a width of each opening preferably ranges from about 20 nm to about 80 nm for visible light incident radiation. The width of the openings 107 may be larger for infrared incident radiation.

An alternative design to the 1×N array pattern described above is to utilize a chirped grating (i.e., opening) pattern. In other words, the grating period (i.e., the period of the openings) is continuously chirped over a distance, L. If a radiation detector is used with the wavelength separation device, then the detector pixel size, W, defines the effective cell size of a wavelength separation device, such as a filter, and the total number of channels of the array will be L/W.

An advantage of this design is that an entire monochromator array can be implemented with a single holographic lithography process, as will be described below.

Figure 15:
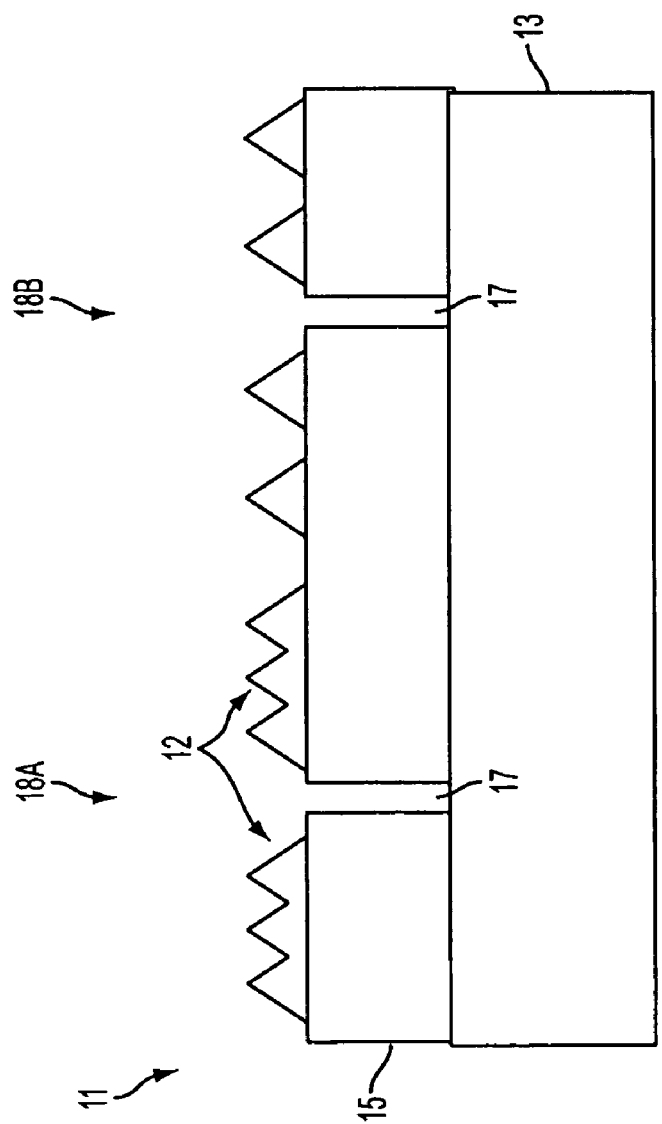
Figure 16:
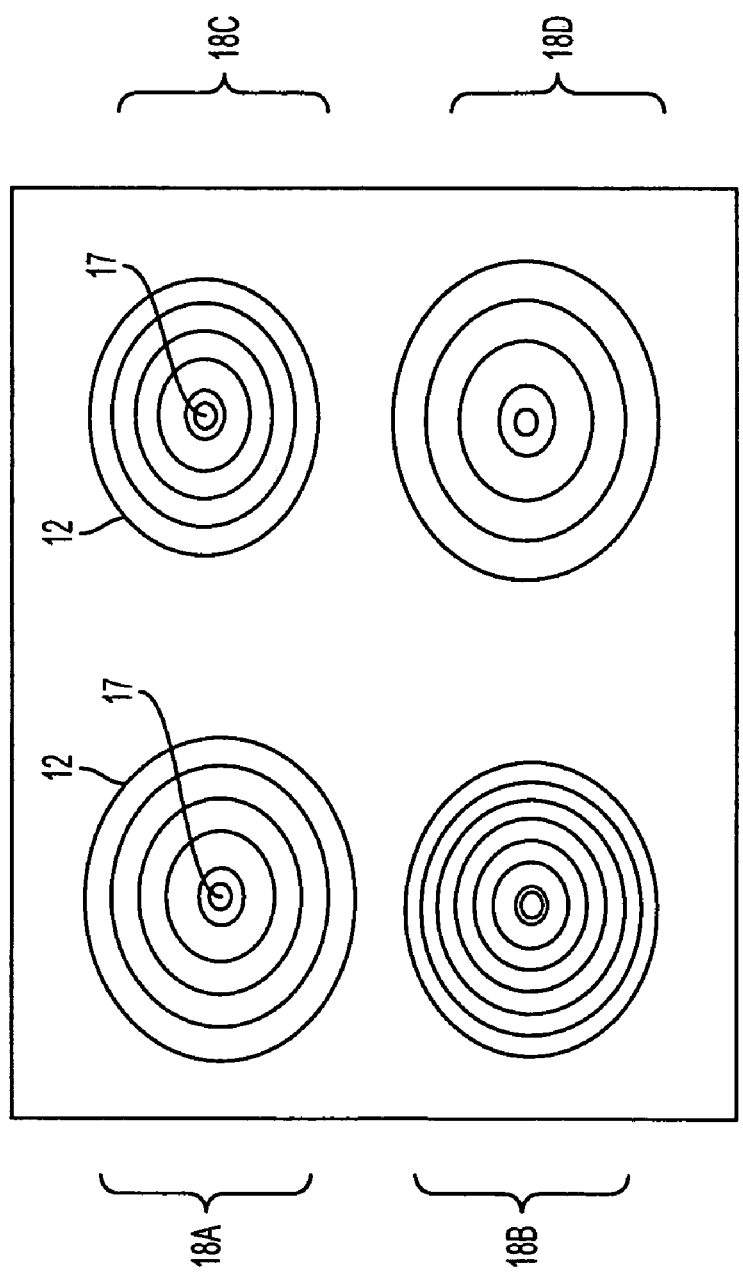

FIGS. 15 and 16 illustrate a wavelength separation device 11 according to a second preferred embodiment of the present invention. As discussed above, the wavelength separation device 11 may also comprise the above described beam shaping device or be used together with the beam shaping device. In the second embodiment, the metal film or metal islands 15 have a periodic or quasi-periodic surface topography 12 provided on at least one surface of the metal film or islands 15, as shown in FIG. 15. If desired, the metal film or islands may be formed on a radiation transparent substrate 13. The topography 12 is configured such that it enhances the transmission of the radiation in the openings 17. The periodic topography 12 may comprise any metal features which provide strong coupling of the metal surface plasmons with incident radiation. For example, the topography may comprise any suitable raised and/or depressed regions on the surface of the metal film or islands 15 which are arranged in a regularly repeating (i.e., quasi-periodic or periodic) pattern, such as a two dimensional lattice. The raised regions may comprise cylindrical protrusions, semi-spherical protrusions, linear or curved ribs, rectangular ribs, raised rings and/or raised spirals. The depressed regions may comprise cylindrical depressions, semi-spherical depressions, linear or curved troughs, rectangular troughs, ring shaped troughs and/or spiral shaped troughs. The width or diameter of the raised or depressed regions is preferably less than the period of these features, and the product of this period with the refractive index of the substrate should be less than the maximum desired transmitted wavelength of the radiation.

The metal film or metal islands 15 comprise at least two cells 18, and preferably a plurality of cells, such as at least 10 cells, more preferably at least 30 cells. Each cell 18A, 18B, 18C, 18D comprises at least one of a plurality of openings 17. The periodic or quasi-periodic surface topography 12 configuration in each of the cells is different than periodic or quasi-periodic surface topography configurations in each of the other cells. Each cell is configured for transmission of passband radiation having a different peak wavelength, as in the first preferred embodiment.

While the linear grating patterns illustrated in FIGS. 12-15 have polarization detection capability as an intrinsic function, the polarization dependence of filters may not be desirable for some applications. The patterns illustrated in FIG. 16 are insensitive to polarization in its transmission. For example, as shown in FIG. 16, circular grating patterns 12 are used in forming corrugations of constant period for each concentric pattern. A subwavelength aperture 17 is made at the center of each pattern, and the incident light will be funneled into the aperture via resonant excitation of surface plasmons at a certain wavelength, which is determined by the grating period. Arranging the circular grating patterns of different periods into a two dimensional array, such as the 2×2 array shown in FIG. 16 results in a 4-channel spectrum analyzer that is insensitive to polarization.

In another preferred aspect of the second embodiment, the surface topography 12 comprises a topography comprising a material other than metal which includes surface plasmon coupling into the metal. In one example, the refractive index of the dielectric layer or ambient medium adjacent to the metal surface is periodically or quasi-periodically modulated, without topographic modulation of the metal surface (i.e., without corrugation/indentation on the metal surface). For example, periodic arrangement of dielectric layer or layers formed on a flat or corrugated metal surface can induce the surface plasmon coupling into metal. Thus, element 12 in FIG. 2D may refer to periodically or quasi-periodically arranged dielectric material features formed on a flat metal film or island 15 surface. Alternatively, a flat or textured dielectric layer or layers with a variable refractive index may be used for plasmon coupling. A variable refractive index in a flat dielectric layer or layers may be achieved by periodically or quasi-periodically modulating the composition of the layer or layers along their width on the metal film or islands. Any suitable dielectric material many be used, such as silica, quartz, alumnia, silicon nitride, etc.

In the second preferred embodiment, the openings or transparent regions 17 are separated by a period $a_o$ which is much larger than the period of the first embodiment, such that the period of the openings 17 does not substantially contribute to the enhancement of the transmission of the radiation. For example, the period $a_o$ is preferably equal to the effective propagation distance of the surface plasmons, such as 5 microns or greater, preferably about 5-10 microns for Ag islands being irradiated with visible light.

The device 101 also acts as a polarization filter. In the case of slit shaped openings in the metal film or between metal islands, (i.e., a 1D grating case), the optical transmission through the sub-wavelength openings depends on the polarization of incident light. For the TE polarized light (i.e., where the E-field is parallel to the grating lines), for example, surface plasmons are not excited due to the unavailability of grating vectors along the E-field direction, since the surface plasmons are longitudinal waves. Therefore, transmission for TE polarizations is expected to be much lower than TM polarization. This polarization dependence can also be utilized for detecting the polarization (and its spatial distribution) of incident light.

Any suitable metal such as Ag, Al, Au and Cu may be used to form the metal film or metal islands. Preferably, metals, including Ag, Al, Au, Cu or their alloys, which exhibit a bulk plasmon frequency in the 9-10 eV range are used. This makes the plasmon-induced phenomena observable in a broad spectral range (Vis-to-IR). Al and Cu are common metals used as interconnect metallization in integrated circuit chips and photodetectors.

Any suitable methods of making the metal islands or metal film with nano apertures may be used to form the nano-optic beam shaping device. For example, the methods described in U.S. Provisional application Nos. 60/492,954, 60/492,955 and 60/492,956 filed on Aug. 6, 2003 and incorporated herein by reference in their entirety, may be used.

For example, if a metal film with apertures is used in the nano optic beam shaping and/or radiation filtering device, then the apertures may be formed by any suitable method. For example, the apertures may be selectively drilled in the metal film using a focused ion beam. Alternatively, the apertures may be formed by photolithography, where a photoresist or other photosensitive layer is selectively exposed to radiation, either through a mask or by selectively moving the exposing electron or radiation beam over the photoresist, the exposed photoresist is then patterned into a mask and the regions of the metal film exposed in the mask are etched by wet or dry etching.

For example, if metal islands are used in the nano optic beam shaping and/or radiation filtering device, then these islands may be formed by any suitable method. For example, in one preferred aspect of the present invention, the metal islands spaced apart by radiation transparent regions or slit shaped openings are formed by self assembly. In other words, rather than forming a metal film and patterning the film into metal islands, the spaced apart metal islands are formed simultaneously or sequentially without first being part of an unpatterned metal film. The metal islands may comprise discrete metal islands that are not connected to each other (i.e., the metal islands are not in direct contact with each other) or metal islands that are connected to each other at a peripheral region of the optical device. In another preferred aspect, the metal islands comprise discrete islands that are formed by patterning a metal film into the islands. Preferably, the islands are patterned using a lithographic method.

The metal islands 5 may have any suitable thickness such that the islands 5 themselves are opaque to radiation but will generate plasmon enhanced radiation transmission through openings or regions 7. Preferably, metal island thickness should be at least about two or three times the skin depth of metal. In silver islands with incident radiation in a visible wavelength range, the skin depth is around 30 nm, and the metal island thickness should be at least about 60 to 90 nm or greater. The skin depth increases for longer wavelength range and is somewhat different for different metals. Thus, for example, the metal islands 5 may have a thickness of about 50 nm to about 2000 nm, such as 100 nm to 400 nm, preferably 120 to 180 nm.

Figure 17:
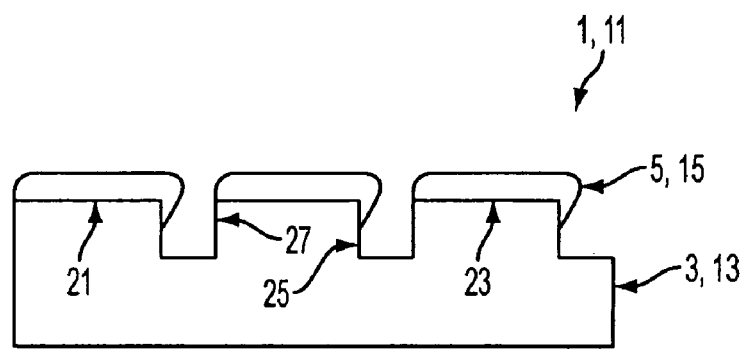

In a preferred aspect of the first and second embodiments, the metal islands 5, 15 are formed by self assembly and are located on a plurality of ridges 21 on the transparent substrate 3, 13. Preferably, as shown in FIG. 17, each one of the plurality of metal islands 5, 15 is located on a corresponding one of the plurality of ridges 21. The metal islands and the ridges may have any suitable shape, as discussed above. Preferably, the metal islands and the ridges are shaped such that the openings 7, 17 between the islands are slit shaped. Thus, a length of each metal island is preferably at least 10 times larger than its width and a length of each ridge is preferably at least 10 times larger than its width. As shown in FIG. 17, the plurality of ridges 21 preferably have a rectangular shape. The ridges 21 may comprise protrusions on the upper portion of the radiation transparent substrate 3, 13, protrusions on the upper portion of a radiation transparent layer located on the radiation transparent substrate or the photodetector 302, 402, or discrete radiation transparent elements located over the radiation transparent substrate or the photodetector 302, 402. Thus, the substrate 3, 13 may comprise a unitary substrate (i.e., a single layer radiation transparent material) or it may contain more than one layer of radiation transparent material. The ridges 21 may have a variable period to form devices of the first preferred embodiment.

Figure 18:
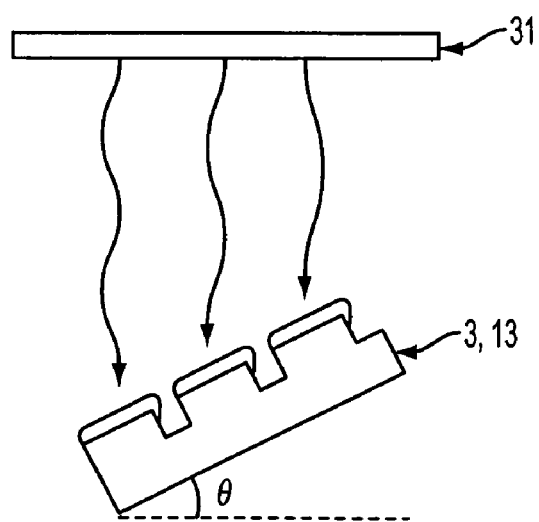
FIG. 18 is a schematic side cross-sectional view of a method of making a device of FIG. 17.

Preferably, each respective metal island 5, 15 extends over an upper surface 23 of each ridge 21 and over at least a portion of at least one side surface 25 of each respective ridge 21. Most preferably, the metal islands are formed by angled deposition, as shown in FIG. 18. In this case, each metal island 5, 15 extends lower over a first side surface 25 of a respective ridge 21 than over a second side surface 27 of the respective ridge 21 because the metal is angle deposited from the first side surface 25, as will be described in more detail below.

In an alternative aspect of the present invention, the substrate 3, 13 comprises a nanopore array. Preferably, the substrate 3, 13 comprises an anodic aluminum oxide nanopore array located over a radiation transparent substrate or the photodetector, as will be described in more detail below.

The optical devices 1, 11 of the preferred aspects of the present invention may be made by any suitable method where a plurality of metal islands 5, 15 are formed on the radiation transparent substrate 3, 13. As described above, the metal islands 5, 15 are preferably selectively deposited on the plurality of ridges 21, such that metal is not deposited between the ridges 21.

FIG. 18 illustrates a preferred method of selectively forming the metal islands 5, 15 by self assembly using angled deposition. In this method, the metal is directed onto the ridges 21 in a non perpendicular direction with respect to tops of the ridges. For example, if the ridges contain a flat upper surface 23, then the metal may be directed at an angle of 20 to 70 degrees, such as 30 to 50 degrees, with respect to the flat upper surfaces 23 of the ridges.

Preferably, the metal islands 5,15 are deposited on the ridges 21 by evaporation (thermal or electron beam), as shown in FIG. 18. In the evaporation method, the metal is evaporated thermally or by an electron beam from a metal source or target 31 onto the substrate 3, 13. For angled deposition, the substrate 3, 13 is inclined by 20 to 70 degrees, such as 30 to 50 degrees, preferably 45 degrees, with respect to the target 31. Since the spaces between the ridges 21 are sufficiently small, no metal is deposited between the ridges during the angled deposition. Thus, the tilt angle theta of the substrate should be sufficient to prevent metal deposition between the ridges 21. The metal islands 5, 15 may also be deposited by any other suitable angled or nonangled metal deposition method, such as metal organic chemical vapor deposition (MOCVD), molecular beam epitaxy (MBE), sputtering and other suitable methods.

The ridges 21 may be formed on the substrate 3, 13 by any suitable method. Preferably, the ridges are made using lithography. Most preferably, the ridges are made using photolithography, as will be described in more detail below. However, the ridges 21 may be made by using imprint or nanoindentation lithography such as, by stamping a transparent unitary or multilayer substrate with a ridged stamp to form a plurality of ridges and grooves in the transparent substrate.

Figure 19A:
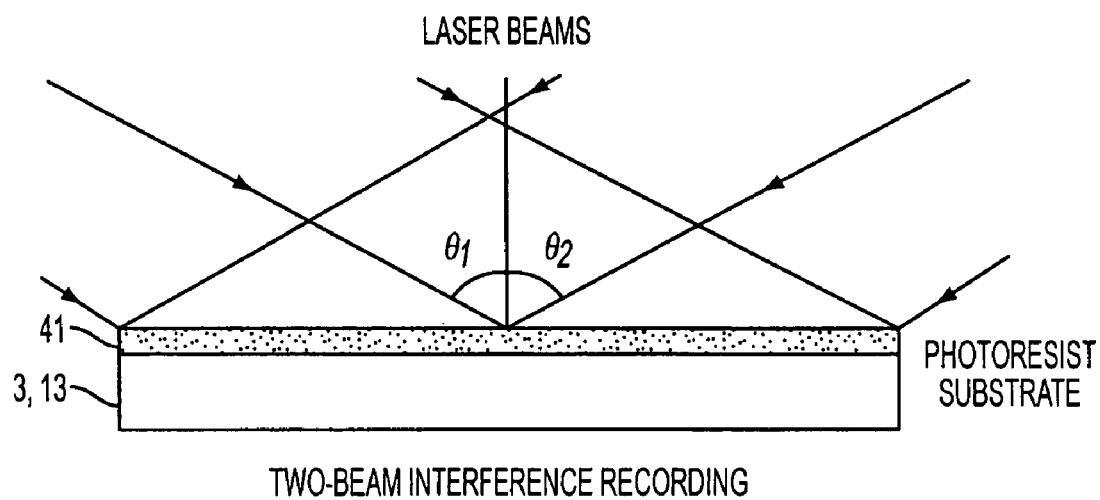
FIGS. 19A and 19B are schematic side cross sectional views of a method of making a device according to embodiments of the invention and FIG. 19C is a schematic top view of a holographic lithography system.
Figure 19B:
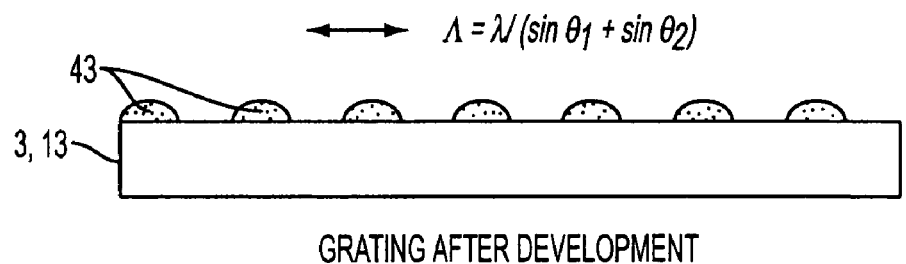
Figure 19C:
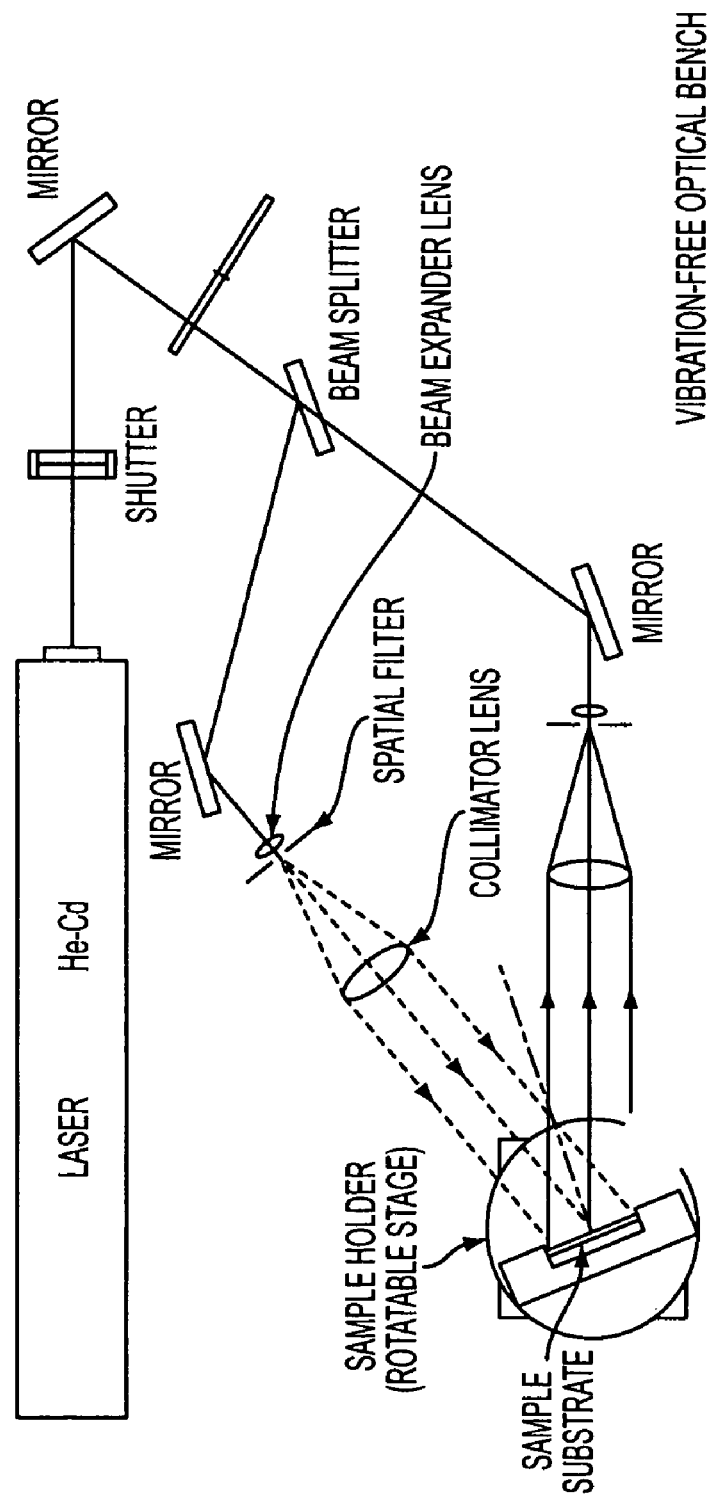

FIGS. 19A, 19B and 19C illustrate one preferred method of forming the ridges in a transparent substrate (i.e., a unitary substrate or a multilayer substrate) 3, 13 or in a layer over the photodetector 203 using photolithography. As shown in FIG. 19A, a photoresist layer 41 is formed on the first surface of the substrate 3, 13 (or photodetector 203). The term "photoresist layer" includes any suitable positive or negative photosensitive layer used for semiconductor and other microdevice patterning. The photoresist layer 41 is then selectively exposed by radiation, such as UV or visible light, or by an electron beam.

The selective exposure can take place through a mask, by selectively scanning a narrow radiation or electron beam across the photoresist layer 41 or holographically. For example, as shown in FIGS. 19B and 19C, the photoresist layer may be separately exposed holographically for each cell of the wavelength separation device or the entire layer may be exposed at the same time for a chirped grating pattern.

To perform holographic lithography, a laser beam is split into two beams. The two beams are then reflected so that they converge together onto the photoresist layer 41. Where the two beams converge, an interference pattern comprised of multiple parallel lines of intense light is generated. The parallel lines of intense light occur with a particular periodicity which may be adjusted by changing the incident beam angle. Further adjustment of the periodicity may be accomplished by changes in optics, e.g., changes in the wavelength of the light source, and/or the refractive index of the ambient dielectric adjacent to the photoresist. Thus, the photoresist is exposed where the two beams converge and not exposed where the two beams do not converge. The length, $\Lambda$, shown in FIG. 19B is equal to the peak wavelength of the split laser beams divided by $(\sin\theta_1 + \sin\theta_2)$, where $\theta_1$ and $\theta_2$ are the angles of the laser beams with the normal to the photoresist surface, as shown in FIG. 19A.

The selective exposure leaves the photoresist layer 41 with exposed and non-exposed regions. The holographic exposure is preferred because it forms slit shaped exposed and non-exposed regions in the photoresist layer 41 which can then be used to form slit shaped ridges and grooves in the substrate.

The exposed photoresist layer 41 is then patterned, as shown in FIG. 19B. If the photoresist layer 41 is a positive photoresist layer, then the exposed regions are removed by a suitable solvent, while leaving the unexposed regions as a photoresist pattern 43 on the substrate 3, 13, as shown in FIG. 19B. If the photoresist layer 41 is a negative photoresist layer, then the unexposed regions are removed by a suitable solvent, while leaving the exposed regions as a photoresist pattern 43 on the substrate 3, 13.

The upper surface of the substrate 3, 13 is then etched to form the ridges using the patterned photoresist layer 41 as a mask (i.e., using the exposed or non-exposed regions 43 remaining on the substrate as a mask). The substrate may be patterned by wet and/or dry etching. It should be noted that other intermediate processing steps, such as photoresist baking, cleaning, etc., may also be added as desired.

Figure 19D:
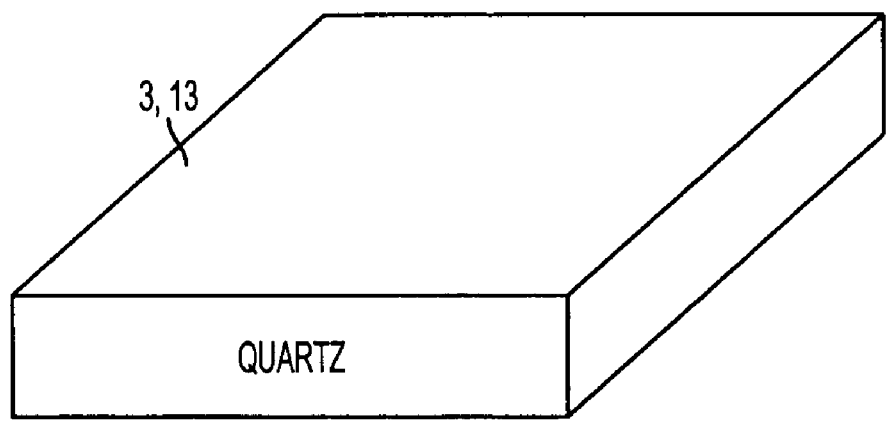
FIGS. 19D-19I are schematic three dimensional views of a method of making a device according to embodiments of the invention.
Figure 19E:
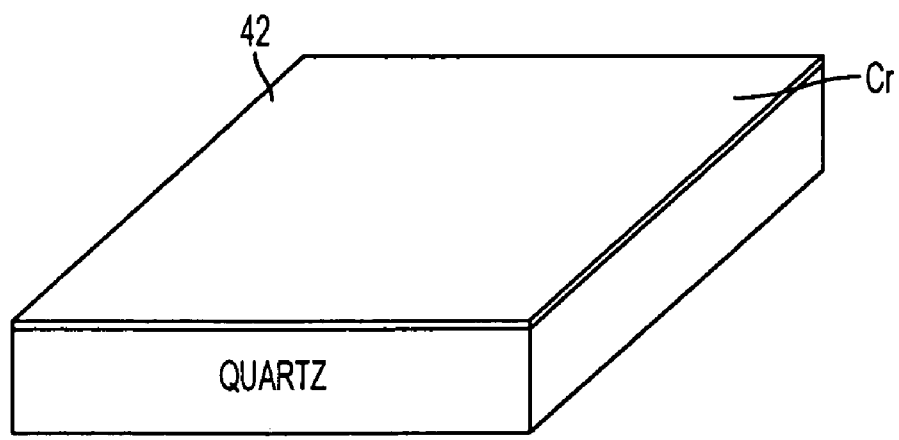
Figure 19F:
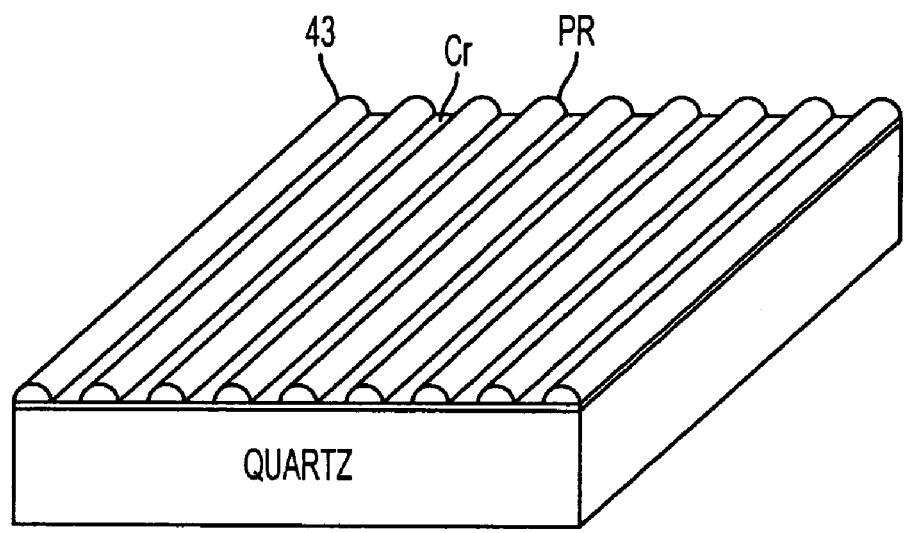
Figure 19G:
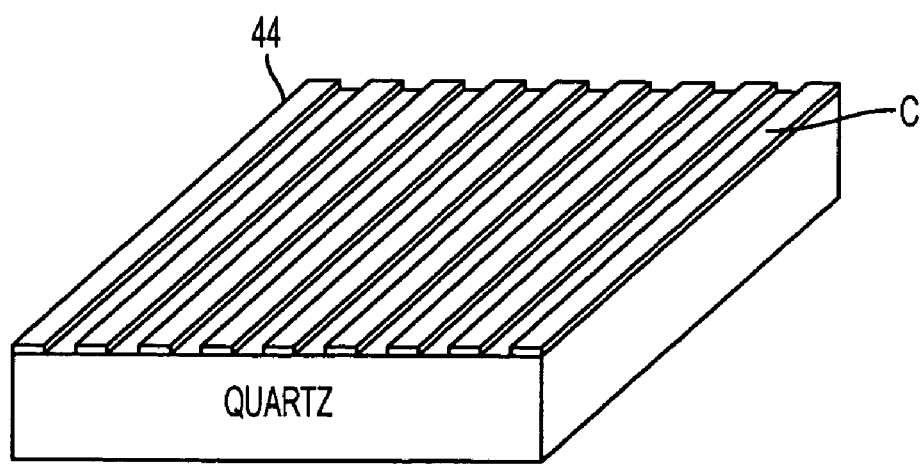
Figure 19H:
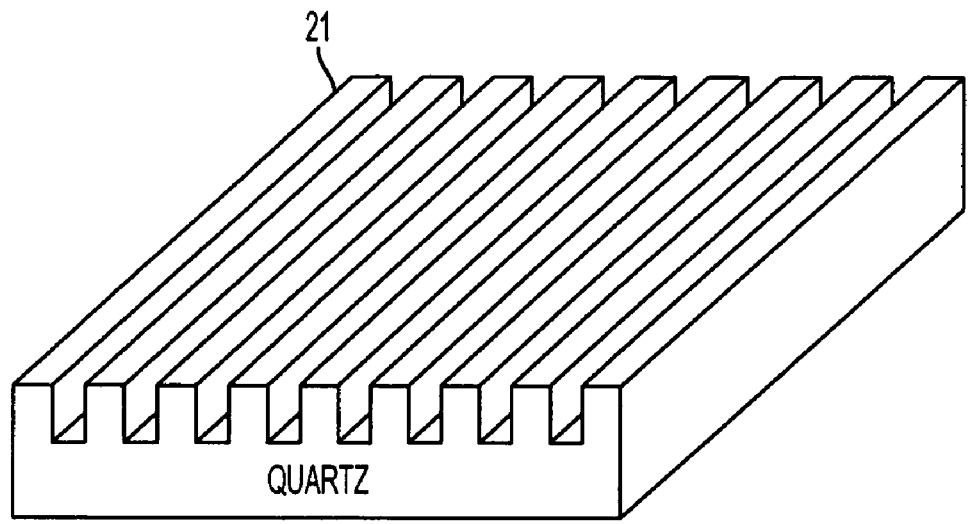
Figure 19I:
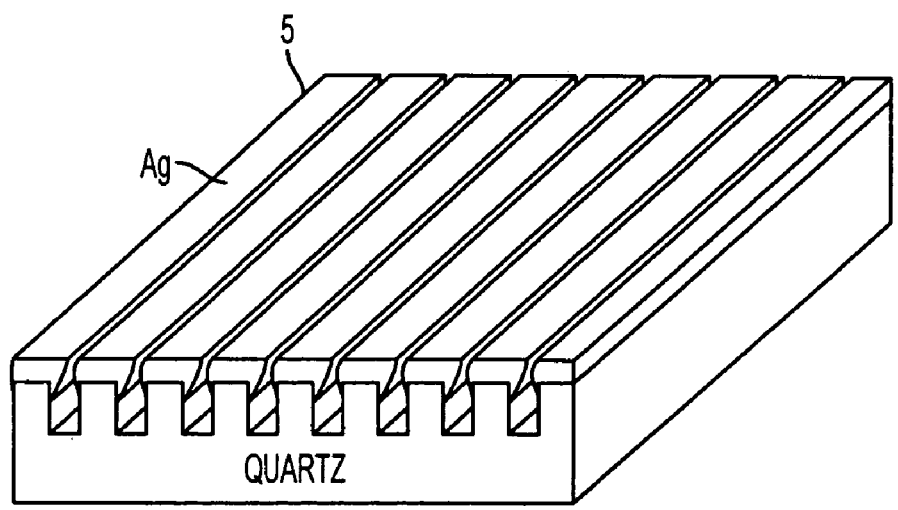

Furthermore, if desired, a hardmask layer, such as a silicon nitride, silicon oxide, silicon oxynitride or a metal layer, such as a chromium layer, may be added between the photoresist layer 41 and the substrate 3, 13 if needed, as shown in FIGS. 19D-19I. As shown in FIGS. 19D and 19E, hardmask layer 42, such as a Cr layer, is formed on the substrate 3, 13. A photoresist pattern 43 is then formed on the hardmask layer 42 by any suitable method, such as the holographic lithography method, as shown in FIG. 19F. The hardmask layer 42 is then patterned using the photoresist pattern 43 as a mask to form a hardmask pattern 44, and then the photoresist pattern 43 is removed, as shown in FIG. 19G. The substrate 3, 13 is then patterned to form the ridges 21 using the hardmask pattern 44 as a mask, as shown in FIG. 19H. The hardmask pattern 44 is then removed. The metal islands 5 are then selectively deposited on the ridges 21, such as by angled deposition, as shown in FIG. 19I.

An example of the parameters of the method described above is as follows. An about 40 nm thick Cr hardmask layer is deposited on a quartz substrate by thermal evaporation. This is followed by HMDS application and photoresist spin coating to a thickness of about 100 nm on the hardmask layer. Microposit Photoresist 1805 and Microposit Type P Thinner in 1:1 volume ratio is used with a spin speed 5000 rpm. The photoresist layer was then subjected to a softbake at 95 degrees Celsius for 30 minutes. The photoresist is exposed by holographic lithography. A UV He—Cd laser (325 nm wavelength, 15 mW CW power) is used for the exposure. The photoresist layer is then developed using Microposit 351 and DI water in 1:4 volume ratio. The developed (i.e., patterned) photoresist is then subjected to a hardbake at 120 degree Celsius for 30 minutes.

The Cr hardmask layer then is etched using the patterned photoresist layer as a mask. The Cr layer is etched using a reactive ion etching (RIE) system (PlasmaTherm 790 ICP/RIE) in a two step etching process. In step 1, $Cl_2$ (20 sccm)+$O_2$ (10 sccm) at 10 mTorr pressure, RIE power of 25 W and ICP power of 100 W for 30 seconds are used. In step 2, Cl$_2$ (24 sccm)+O$_2$ (6 sccm) at 10 mTorr pressure, RIE power of 10 W and ICP power of 100 W for 7 minutes are used.

The patterned hardmask layer is then used as a mask to pattern the quartz substrate. The quartz substrate is etched by RIE using CF$_4$ (37 sccm)+O$_2$ (4 sccm) at 15 mTorr, RIE power of 100 W and ICP power of 150 W for 12 minutes. Thereafter, the remaining Cr hardmask is removed by chemical etching with NaOH+K$_3$Fe(CN)$_6$+H$_2$O solution. The Ag islands are then deposited on the mesa etched substrates using angled deposition. The Ag islands are deposited to various thicknesses using thermal evaporation of Ag source in a base pressure of 10$^{-5}$ Torr with a tilt angle of 45 degrees.

Figure 20A:
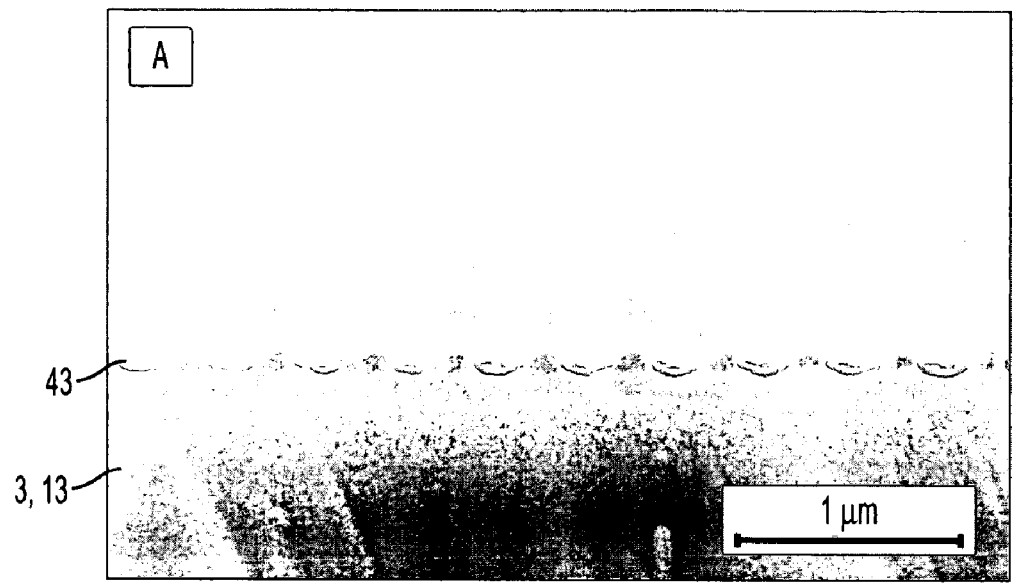
FIGS. 20A, 20B and 20C are micrographs of a method of making a nanopore array according to embodiments of the invention.
Figure 20B:
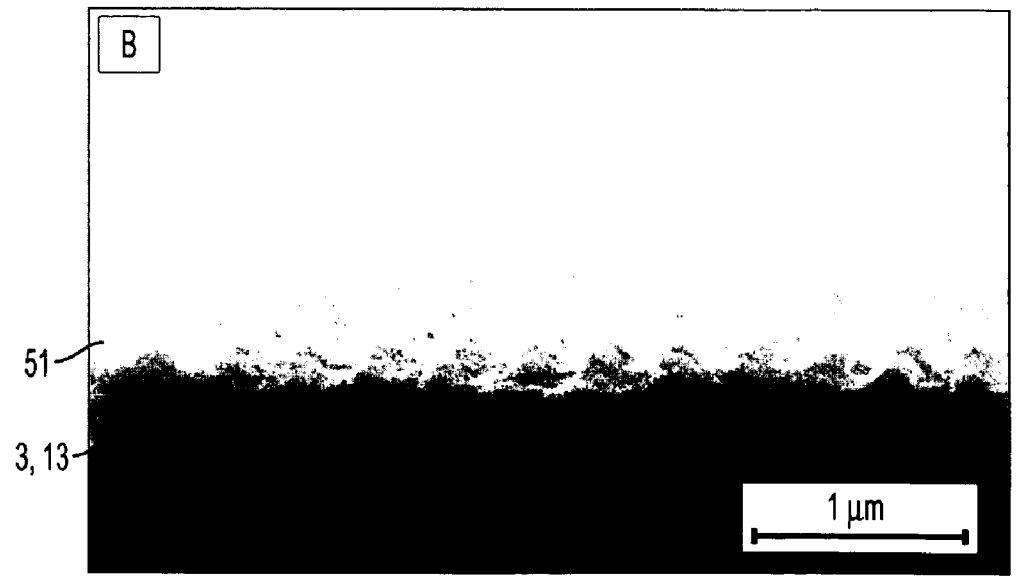

FIGS. 20A and 20B illustrate another preferred method of forming the ridges in a transparent substrate (i.e., a unitary substrate or a multilayer substrate) 3, 13 or over a photodetector using photolithography and a nanopore array. One exemplary method of forming a nanopore array is described in Z. Sun and H. K. Kim, Appl. Phys. Lett., 81 (18) (2002) 3458, incorporated by reference herein in its entirety.

First, as shown in FIG. 20A, a photoresist pattern 43 in a shape of a grating is formed on the substrate 3, 13 or over the photodetector 203 in the same manner as described above and as illustrated in FIGS. 19A-19B. The photoresist pattern may be formed by holographic or non-holographic lithography. After forming the photoresist pattern 43, the substrate 3, 13 may be etched to transfer the grating pattern to the substrate to form ridges 21 illustrated in FIG. 17, after which the photoresist pattern 43 is removed. Alternatively, the substrate etching and photoresist pattern removal steps may be omitted.

A metal layer 51 capable of being anodically oxidized is conformally deposited over the ridges 21, if the ridges are present, or over the photoresist pattern 43, if the photoresist pattern has not been removed, as shown in FIG. 20B. The conformally deposited metal layer 51 assumes the grating pattern of the underlying substrate or photoresist pattern, as shown in FIG. 20B. In other words, the metal layer 51 is formed on a grating patterned transparent substrate (i.e., a ridged substrate or a patterned photoresist 43 covered substrate) such that the grating pattern of the substrate 3, 13 is translated to an upper surface of the first metal layer 51.

The metal layer 51 may comprise any suitable metal, such as Al, Ta, Ti, Nb and their alloys, which may be anodically anodized. The metal layer 51 may be deposited by any suitable method, such as sputtering, MOCVD, evaporation (thermal or electron beam), MBE, etc. The metal layer 51 may have any suitable thickness, such as 100 to 1000 nm, preferably 350-400 nm. The corrugation depth in the upper surface of the metal layer 51 is preferably about the same as the corrugation depth of the substrate or the photoresist pattern. Preferably, the corrugation depth of the metal layer 51 is about 20 to about 300 nm, such as about 80 to 100 nm.

Figure 20C:
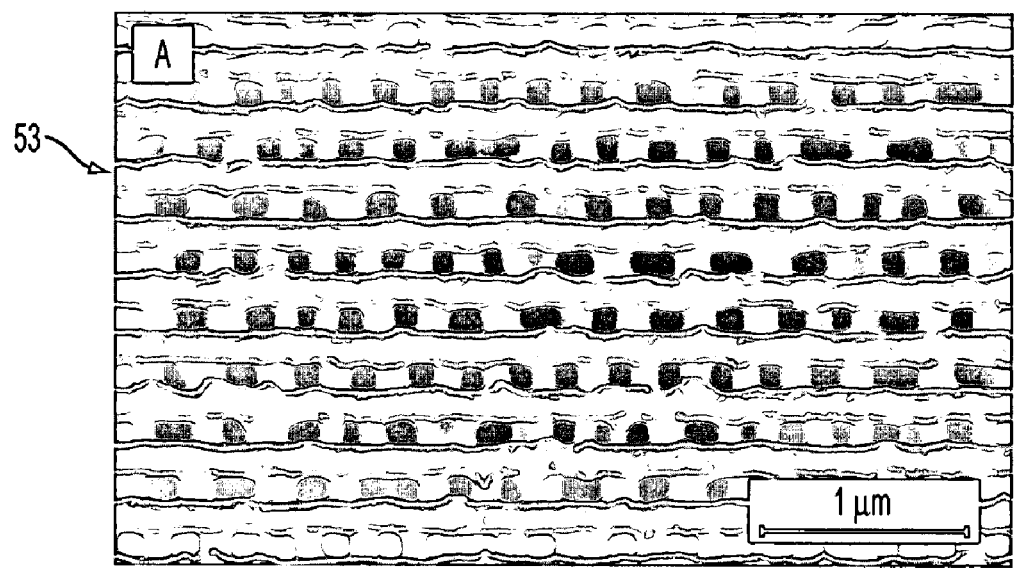

The metal layer 51 then is oxidized anodically, by any suitable method. For example, an Al layer 51 on a silica substrate 3, 13 may be anodically oxidized in dilute electrolyte (1 H$_3$PO$_4$+800 H$_2$O in volume ratio) at room temperature using a platinum wire as a counter electrode. The anodization is preferably conducted under a constant voltage mode for about 40 minutes. The anodic voltage is chosen such that the expected pore distance matches the grating period, for example 140 volts for a 350 nanometer grating period. In a naturally-formed alumina pore array, the inter-pore distance is proportional to the anodization voltage, i.e., about 2.5 nanometers/volt. The voltage may be varied for anodizing different portions of the metal layer to form pores with a variable period. After anodization, the samples are preferably treated with phosphoric acid (diluted with water in a 1:3 volume ratio) for one to two minutes. FIG. 20C is a electron micrograph of a nanopore array 53 grown in the grating patterned aluminum layer 51 when the aluminum layer 51 is converted to aluminum oxide by anodic oxidation. The resulting alumina pores exhibit a uniform depth, such as about 100 to 2000 nm, preferably about 300 to 400 nm and the pore bottom has a concave, hemispherical shape with barrier thickness of about 100 to 300 nm, such as 150 to 200 nm. The preferred pore diameter is about 5 to 100 nm, such as 5 to 10 nm. The nanopores selectively form in troughs of the grating pattern in the upper surface of the anodically oxidized metal layer 51.

Figure 20D:
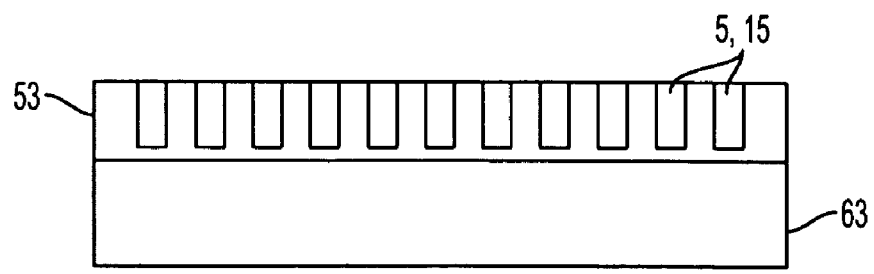
FIG. 20D is a schematic side cross-sectional view of a device according to embodiments of the invention.
Figure 20E:
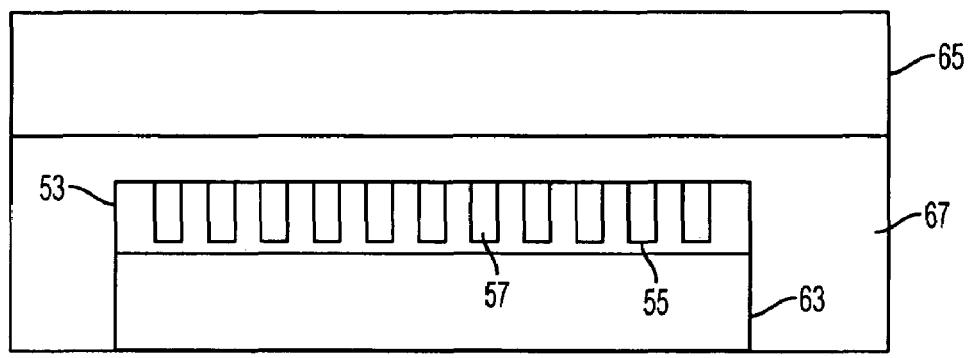
FIG. 20E is a schematic side cross-sectional view of an electroplating bath used to make the device of FIG. 20D.

After forming the nanopore array 53, such as the array shown in FIG. 20C, metal islands 5, 15 are selectively grown in the nanopores, as shown in FIG. 20D. One preferred method of selectively growing metal islands inside the nanopores in a metal oxide layer is an electroplating method illustrated in FIG. 20E. The nanopore array 53 is formed on a conductive or a semiconducting substrate 63. The substrate 63 may comprise a metal layer, such as a metal layer which is not anodically oxidized, or a doped semiconductor layer, such as silicon, gallium arsenide or gallium nitride. The substrate 63 may comprise the radiation transparent substrate 3, 13 used in the devices 1, 11 or the substrate 63 may comprise a temporary substrate which is transparent or non-transparent to radiation. The substrate 63 and array 53 are then provided into an electroplating bath 65 containing a liquid metal 67. A potential difference (i.e., a voltage) is applied between the substrate 63 and the array 53. Since the array 53 is thinner in regions 55 below the nanopores 57, a voltage gradient exists in these regions 55. This causes the metal 67 from bath 65 to selectively deposit into the nanopores 57. If desired, the electroplating method may be used to selectively fill the nanopores 57 with metal 67 from bath 65. The metal 67 may be any metal which exhibits the previously described plasmon enhancement effect and which may be deposited into metal oxide pores by electrodeposition, such as Ni, Au, Pt and their alloys. Thus, the islands 5, 15 are formed by filling the nanopores 57 with the electroplated metal 67. By filling nanopores with electroplated metal, a metal island array can be formed that is suitable for an optical device, such as a monochromator and image analyzer applications, and that has a structure complementary to the structure illustrated in FIG. 14.

In an alternative preferred aspect of the present invention, the nanopores 57 are filled only part of the way with the metal 67 during the electroplating step. In this case, the metal 67 may be any metal which can act as a catalyst for selective metal vapor deposition. For example, the metal 67 may be Au. The array 53 with the catalyst metal 67 formed on the bottom of the nanopores 57 is then transferred to a metal vapor deposition chamber, such as a chemical vapor deposition chamber. Metal islands 5,15 are then selectively grown on the catalyst metal 67 by selective vapor deposition. The metal islands 5, 15 may comprise any metal which exhibits the previously described plasmon enhancement effect and which may be selectively deposited on a catalyst metal 67, but not on metal oxide walls of the nanopore array 53. For example, this metal may comprise Al or Ag.

If the nanopore array 53 is formed on a temporary substrate 63, then the temporary substrate may be removed from the array 53 before or after the formation of the metal islands 5, 15 on the array 53. The temporary substrate may be removed by selective etching, polishing or chemical mechanical polishing of the substrate, by selective etching of a release layer (not shown for clarity) located between the temporary substrate 63 and the array 53, or by peeling the substrate 63 away from the array 53. In case of peeling, one or more peel apart layers may be located between the substrate 63 and the array 53. The peel apart layer(s) have a low adhesion and/or strength such that they can be separated mechanically from each other or from the array and/or the substrate. The transparent substrate 3, 13 or the photodetector 203 is then attached to the array 53 before or after forming the metal islands 5,15 on the array, on the same and/or opposite side of the array 53 from where the temporary substrate 63 was located.

In an alternative aspect of the present invention, a metal film with a plurality of openings, such as a metal film shown in FIG. 14 is formed by angled deposition of metal on the ridges of a nanopore array. The angled deposition method is described above and illustrated in FIG. 18. In another alternative aspect of the present invention, a metal layer is deposited over the nanopore array such that metal extends into the pores, and the metal layer is then chemically mechanically polished or etched back to expose top portions of the nanopore array. The polishing or etch back step leaves discrete metal islands in the nanopores, separated by the metal oxide nanopore array transparent regions.

In another alternative aspect of the present invention, the nanopore array is formed without first patterning the substrate 3, 13 or forming the photoresist pattern 43. In this aspect, a metal layer 51, such as an Al, Ta, Ti or Nb layer is deposited on the unpatterned substrate or over an optical device such as a photodetector. Then corrugations are formed in the metal layer 51 by any suitable method. For example, the corrugations may be formed by selective laser ablation of the metal layer, by nanoindentation or nanoimprinting, or by photolithography (i.e., by forming a photoresist pattern on the metal layer, then etching the metal layer using the pattern as a mask and removing the photoresist pattern). Preferably, holographic photolithography is used to pattern the metal layer 51, and a temporary silicon nitride, silicon oxide or silicon oxynitride hard mask is used between the photoresist and the metal layer 51. Then, the metal layer 51 is anodically oxidized as described above.

Figure 21A:
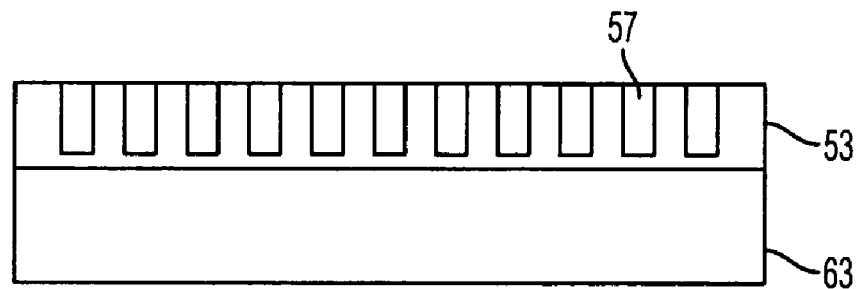
FIGS. 21A, 21B, 21C and 21D are schematic side-cross sectional views of a method of making a device according to embodiments of the invention.
Figure 21B:
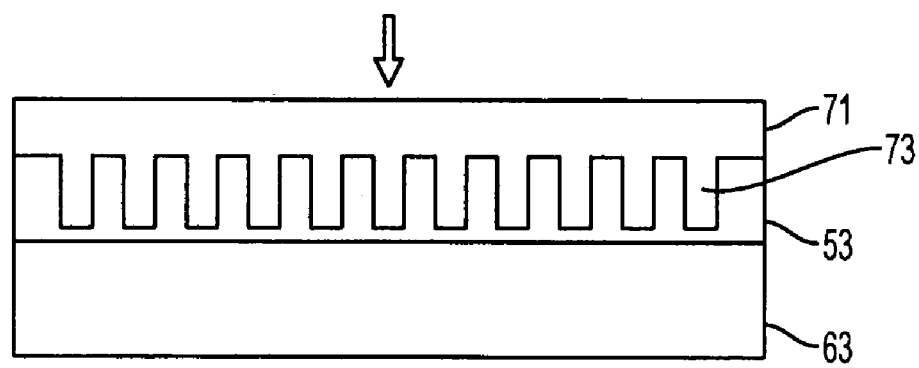

FIGS. 21A-D illustrate an alternative method of forming the metal islands using a templated nanopore array. As shown in FIG. 21A, the metal oxide nanopore array 53 on substrate 63 is formed using the method described above and illustrated in FIGS. 20A-20C. Then, a conformal template material 71 is deposited over the array 63, as shown in FIG. 21B. The conformal template material 71 may comprise any material which can conformally fill the nanopores 57 of the array 53. For example, the conformal template material 71 may comprise silicon oxide, silicon nitride, a glass heated above its glass transition temperature, a CVD phospho- or a borophosphosilicate glass (PSG or BPSG, respectively), a spin on glass or a polymer material. If desired, the conformal template material may comprise all or part of the transparent substrate 3, 13.

Figure 21C:
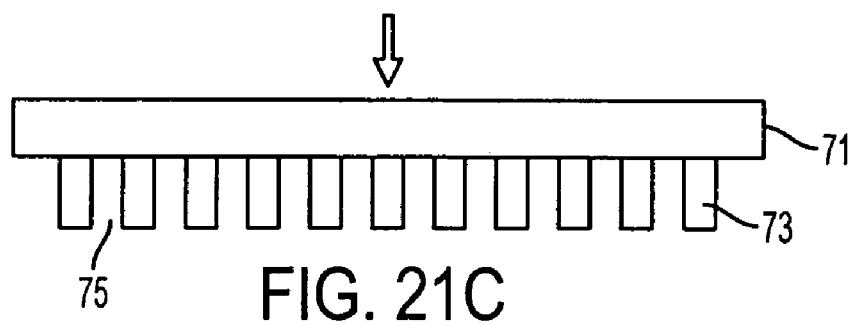
Figure 21D:
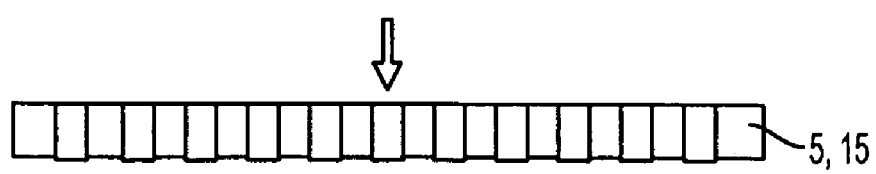

Then, as shown in FIG. 21C, the conformal template material 71 is removed from the nanopore array 53. The conformal template material 71 contains ridges 73 which previously extended into the nanopores 57 of the array. Then, the metal islands 5,15 are selectively deposited into the pores 75 between the ridges 73 of the conformal template material 71 using the electroplating method or on the ridges 73 using angled deposition method as described above. If the conformal template material 71 is the transparent substrate 3, 13 material, then the process stops at this point. If the conformal template material 71 is not the transparent substrate 3, 13, then the conformal template material 71 is separated from the metal islands 5, 15 by any suitable method, such as selective etching, polishing or chemical mechanical polishing. The metal islands 5, 15 are attached to the transparent substrate 3, 13 before or after removing material 71.

Figure 22A:
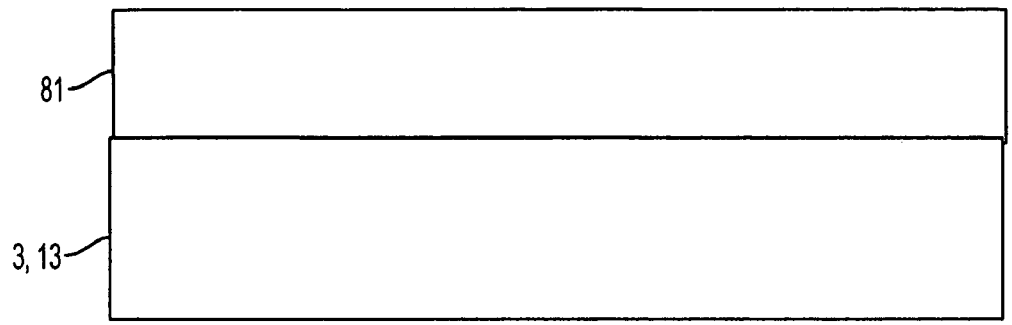
FIGS. 22A and 22B are schematic side cross-sectional views of a method of making a device according to embodiments of the invention.
Figure 22B:
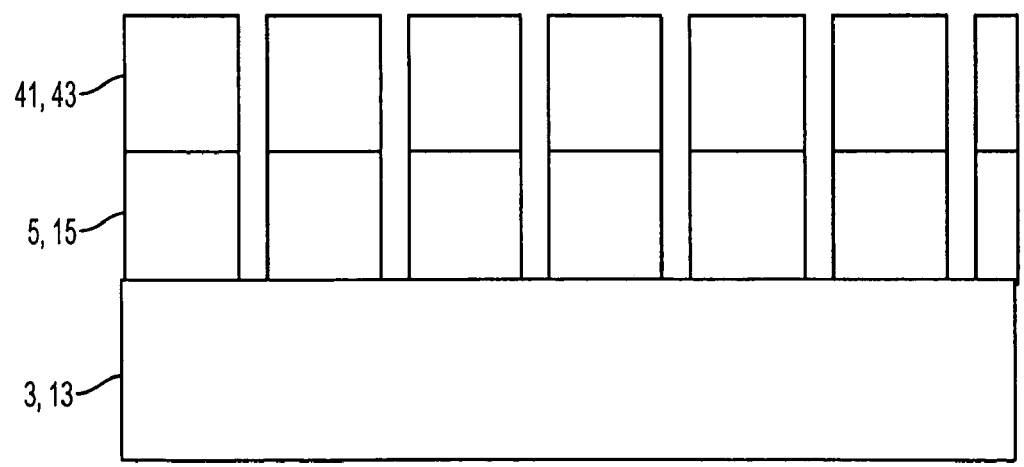

FIGS. 22A and 22B illustrate an alternative method of forming the metal islands 5, 15 without using ridges on a substrate and without using a nanopore array. In this method, a metal layer 81 is formed on the substrate 3, 13, as shown in FIG. 22A. The substrate 3, 13 may contain features on its upper surface or it may contain a flat upper surface. The metal layer 81 is then patterned into a plurality of metal islands 5, 15 as shown in FIG. 22B. The metal layer 81 may be patterned lithographically as described previously. Thus, a photoresist layer 41 is formed on a first surface of the metal layer 81. The photoresist layer is selectively exposed to form exposed and non-exposed regions. The exposed photoresist layer is patterned into pattern 43 and the metal layer is etched into the plurality of islands 5, 15 using the patterned photoresist layer as a mask.

The photoresist layer may be exposed holographically or non-holographically. If desired, an optional, temporary hardmask layer described above may be formed between the metal layer 81 and the photoresist. Alternatively, the metal layer may be patterned by selective laser ablation or other non-photolithographic methods instead of by photolithography.

Figure 23A:
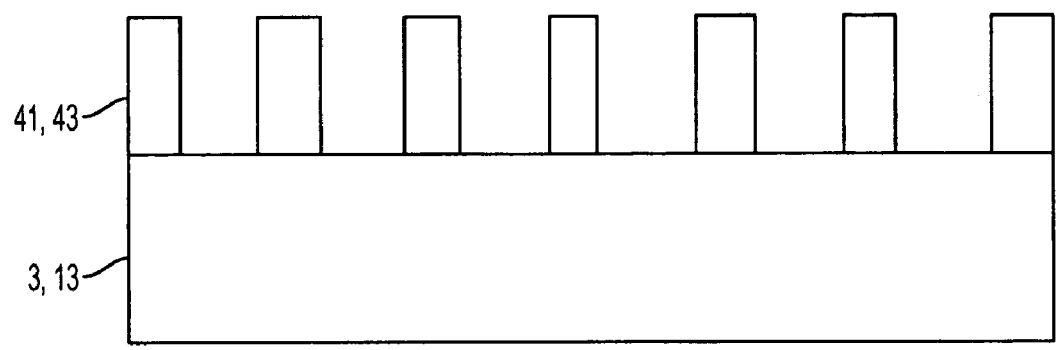
FIGS. 23A, 23B, and 23C are schematic side cross-sectional views of a method of making a device according to embodiments of the invention.
Figure 23B:
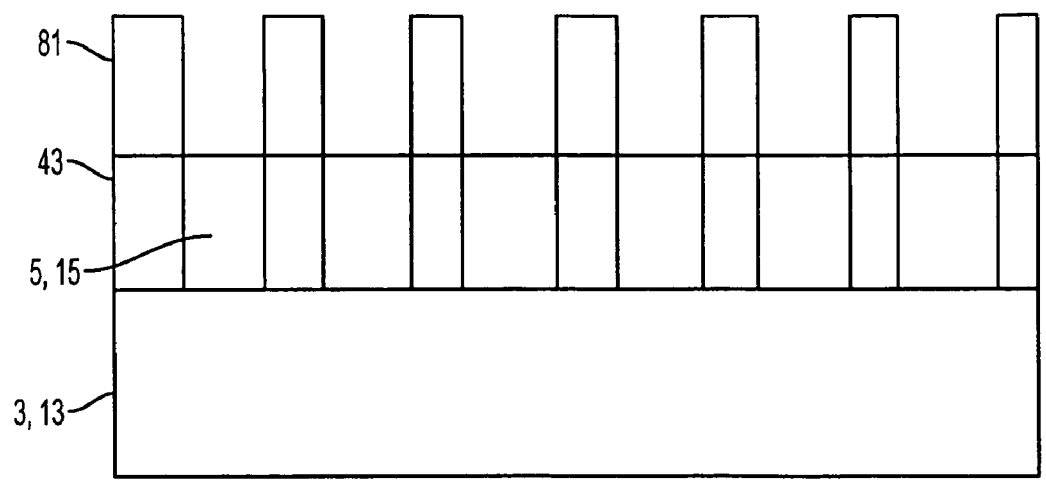
Figure 23C:
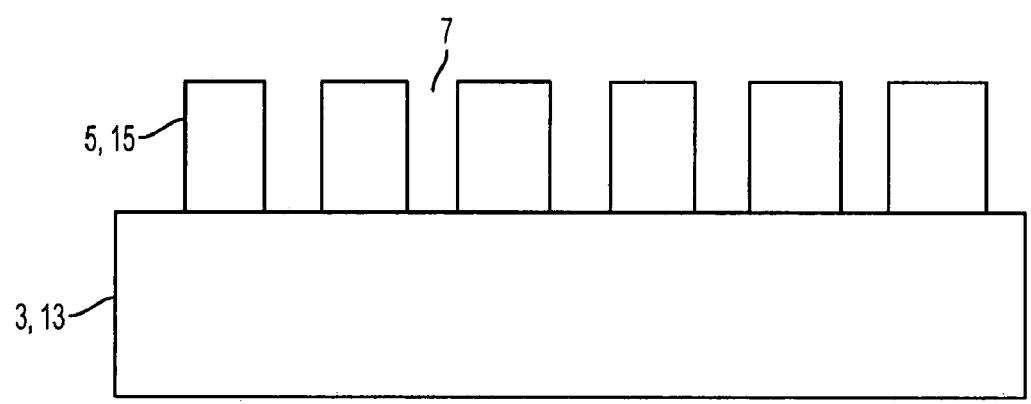

FIGS. 23A, 23B and 23C illustrate an alternative lift off method of forming the metal islands 5, 15. This method also does not require using ridges on a substrate or a nanopore array. In this method, a photoresist layer 41 is formed on the substrate 3, 13 or over the photodetector 203 as shown in FIG. 23A. The substrate 3, 13, may contain features on its upper surface or it may contain a flat upper surface. The photoresist layer is selectively exposed to form exposed and non-exposed regions. The photoresist layer may be exposed holographically or non-holographically.

The exposed photoresist layer 41 then is patterned to form a photoresist pattern 43, exposing portion of the upper surface of the substrate 3, 13. As shown in FIG. 23B, a metal layer 81 is formed over the photoresist pattern 43 and over exposed portions of the upper surface of the substrate 3, 13.

As shown in FIG. 23C, the photoresist pattern 43 is then lifted off, such as by selective etching or other suitable lift off techniques. Portions of the metal layer 81 located on the photoresist pattern 43 are lifted off with the pattern 43 to leave a plurality of metal islands 5, 15 on the upper surface of the substrate 3, 13.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A nano-optic device comprising a plurality of subwavelength apertures in a metal film or between metal islands, wherein the device is adapted to shape a radiation beam transmitted there through and wherein:

each aperture has a width that is less than a first peak wavelength of incident radiation to be provided onto the film or islands; and the metal film or islands are configured such that the incident radiation is resonant with at least one plasmon mode on the metal film or metal islands, thereby enhancing transmission of radiation having at least one second peak wavelength through the apertures.

2. The device of claim 1, wherein shaping the radiation beam comprises at least one of beam focusing, beam bending and beam collimating.

3. The device of claim 1, wherein the device comprises a lens which is adapted to focus the radiation beam to a spot that is the same as or smaller than a peak wavelength of the radiation beam.

4. The device of claim 3, wherein the spot size ranges from 10 nm to 800 nm.

5. The device of claim 3, wherein the lens comprises a metal film having a convex profile such that the apertures have a different depth in a half elliptical profile.

6. The device of claim 3, wherein the lens comprises a flat metal film containing the apertures and a dielectric lens mounted thereon.

7. The device of claim 1, wherein the device is a beam bending device comprising a metal film containing different transparent refractive index materials in different apertures, above different apertures or in and above different apertures.

8. The device of claim 1, wherein the device is a beam bending device comprising a metal film containing, or metal islands separated by, apertures of different width.

9. The device of claim 1, wherein the device further comprises at least one of a spatial, wavelength and polarization filter.

10. The device of claim 1, wherein the device is used together with at least one of a spatial, wavelength and polarization filter.

11. The device of claim 1, wherein each aperture serves as a dipole source radiating optical power at an exit surface of the metal film or islands.

12. The device of claim 11, wherein the dipole elements are designed to have a predetermined phase relationship among them controlled by at least one of a path length difference and an effective index difference in the aperture regions.

13. The device of claim 1, wherein the aperture width is between 15 nm and 700 nm.

14. A nano-optic device comprising a plurality of sub-wavelength apertures in a metal film or between metal islands, wherein the device is adapted to shape a radiation beam transmitted there through and wherein:
    the device comprises a lens which is adapted to focus the radiation beam to a spot that is the same as or smaller than a peak wavelength of the radiation beam; and
    the lens comprises:
    i) a metal film or metal islands having a convex profile such that the apertures have a different depth in a half elliptical profile; or
    ii) a dielectric lens mounted on a flat metal film containing the apertures or on flat metal islands separated by the apertures.

15. The device of claim 14, wherein the spot size ranges from 10 nm to 800 nm and the aperture width is between 15 nm and 700 nm.

16. The device of claim 14, wherein:
    each aperture has a width that is less than a first peak wavelength of incident radiation to be provided onto the film or islands; and
    the metal film or islands are configured such that the incident radiation is resonant with at least one plasmon mode on the metal film or metal islands, thereby enhancing transmission of radiation having at least one second peak wavelength through the apertures.

17. The device of claim 14, wherein the device further comprises at least one of a spatial, wavelength and polarization filter or the device is used together with at least one of a spatial, wavelength and polarization filter.

18. The device of claim 14, wherein:
    each aperture serves as a dipole source radiating optical power at an exit surface of the metal film or islands; and
    the dipole elements are designed to have a predetermined phase relationship among them controlled by at least one of a path length difference and an effective index difference in the aperture regions.

19. The device of claim 14, wherein the lens comprises the metal film having the convex profile such that the apertures have the different depth in the half elliptical profile.

20. The device of claim 14, wherein the lens comprises the metal islands having the convex profile such that the apertures have the different depth in the half elliptical profile.

21. The device of claim 14, wherein the lens comprises the dielectric lens mounted on the flat metal film containing the apertures.

22. The device of claim 14, wherein the lens comprises the dielectric lens mounted on the flat metal islands separated by the apertures.

23. A nano-optic device comprising a plurality of sub-wavelength apertures in a metal film or between metal islands, wherein the device is adapted to shape a radiation beam transmitted there through and the device comprises a beam bending device wherein:
    i) the metal film contains apertures of different width; or
    ii) the metal islands are separated by apertures of different width; or
    iii) different transparent refractive index materials are located in different apertures, above different apertures or in and above different apertures.

24. The device of claim 23, wherein the aperture width is between 15 nm and 700 nm.

25. The device of claim 23, wherein:
    each aperture has a width that is less than a first peak wavelength of incident radiation to be provided onto the film or islands; and
    the metal film or islands are configured such that the incident radiation is resonant with at least one plasmon mode on the metal film or metal islands, thereby enhancing transmission of radiation having at least one second peak wavelength through the apertures.

26. The device of claim 23, wherein the device further comprises at least one of a spatial, wavelength and polarization filter or the device is used together with at least one of a spatial, wavelength and polarization filter.

27. The device of claim 23, wherein:
    each aperture serves as a dipole source radiating optical power at an exit surface of the metal film or islands; and
    the dipole elements are designed to have a predetermined phase relationship among them controlled by at least one of a path length difference and an effective index difference in the aperture regions.

28. The device of claim 23, wherein the device comprises the metal film containing apertures of different width.

29. The device of claim 23, wherein the device comprises the metal islands separated by apertures of different width.

30. The device of claim 23, wherein the device comprises different transparent refractive index materials located in different apertures, above different apertures, or in and above different apertures.

31. A nano-optic device comprising a plurality of sub-wavelength apertures in a flat metal film or between metal islands, wherein the device is adapted to shape a radiation beam transmitted there through and wherein the device further comprises at least one of a spatial, wavelength and polarization filter.

32. A nano-optic device comprising a plurality of sub-wavelength apertures in a flat metal film or between metal islands, wherein the device is adapted to shape a radiation beam transmitted there through and wherein:

each aperture serves as a dipole source radiating optical power at an exit surface of the metal film or islands; and the dipole elements are designed to have a predetermined phase relationship among them controlled by at least one of a path length difference and an effective index difference in the aperture regions.

* * * * *